United States Patent
Kawamoto

(10) Patent No.: US 10,180,944 B2
(45) Date of Patent: Jan. 15, 2019

(54) INFORMATION PROCESSING DEVICE, NON-TRANSITORY COMPUTER READABLE RECORDING MEDIUM AND INFORMATION PROCESSING METHOD FOR TRANSFERRING FILES FROM A FIRST SERVER TO A SECOND SERVER

(71) Applicant: Konica Minolta, Inc., Chiyoda-ky, Tokyo (JP)

(72) Inventor: Masayuki Kawamoto, Amagasaki (JP)

(73) Assignee: Konica Minolta, Inc., Chiyoda-ku, Tokyo (JP)

(*) Notice: Subject to any disclaimer, the term of this patent is extended or adjusted under 35 U.S.C. 154(b) by 362 days.

(21) Appl. No.: 14/818,793

(22) Filed: Aug. 5, 2015

(65) Prior Publication Data

US 2016/0042004 A1 Feb. 11, 2016

(30) Foreign Application Priority Data

Aug. 7, 2014 (JP) .................................. 2014-161021

(51) Int. Cl.
*G06F 17/30* (2006.01)
*H04L 29/08* (2006.01)
(Continued)

(52) U.S. Cl.
CPC ...... *G06F 17/30126* (2013.01); *G06F 3/1454* (2013.01); *G06F 17/30203* (2013.01);
(Continued)

(58) Field of Classification Search
CPC ........ G06F 3/0486; G06F 3/1454; G06F 8/34; G06F 17/30126; G06F 17/30203; H04L 67/06; H04L 67/02
See application file for complete search history.

(56) References Cited

U.S. PATENT DOCUMENTS 6,407,752 B1 * 6/2002 Harnett ............. G06F 17/30067
707/E17.01
2002/0069239 A1 6/2002 Katada et al.
(Continued)

FOREIGN PATENT DOCUMENTS

JP 2002-176675 A 6/2002
JP 2006-172193 A 6/2006
(Continued)

OTHER PUBLICATIONS

Office Action dated Nov. 8, 2016, by the Japanese Patent Office in corresponding Japanese Patent Application No. 2014-161021, and an English Translation of the Office Action. (15 pages).
(Continued)

*Primary Examiner* — William L Bashore
*Assistant Examiner* — Daniel W Parcher
(74) *Attorney, Agent, or Firm* — Buchanan Ingersoll & Rooney PC

(57) ABSTRACT

An information processing device, comprises: a link information obtaining part that obtains link information to a file corresponding to a selected web content in response to detecting a select of at least one of web contents from a first contents screen on which the web contents obtained from a first storage server are laid out; a storage information obtaining part that obtains storage information of a second storage server corresponding to a designated display area in response to detecting a designating operation of the display area of the web content on a second contents screen after the link information is obtained; a file obtaining part that obtains the file corresponding to the selected web content from the first storage server based on the link information; and a file transmitting part that sends the file obtained by the file obtaining part to the second storage server based on the storage information.

19 Claims, 17 Drawing Sheets

(51) Int. Cl.
*G06F 3/0486* (2013.01)
*G06F 3/14* (2006.01)

(52) U.S. Cl.
CPC .............. *H04L 67/02* (2013.01); *H04L 67/06* (2013.01); *G06F 3/0486* (2013.01)

(56) References Cited

U.S. PATENT DOCUMENTS

| | | | |
|---|---|---|---|
| 2002/0184224 A1* | 12/2002 | Haff | .................. H04L 29/06 |
| 2002/0196271 A1* | 12/2002 | Windl | .................. G06F 3/0486 715/734 |
| 2004/0100501 A1 | 5/2004 | Dornback | |
| 2006/0136828 A1 | 6/2006 | Asano | |
| 2007/0084920 A1 | 4/2007 | Slatter et al. | |
| 2009/0276439 A1 | 11/2009 | Rosenblatt et al. | |
| 2009/0276547 A1 | 11/2009 | Rosenblatt et al. | |
| 2010/0269056 A1 | 10/2010 | Fujita et al. | |
| 2011/0016418 A1 | 1/2011 | Fujita et al. | |
| 2012/0159595 A1* | 6/2012 | Barham | .............. H04L 67/1095 726/7 |
| 2013/0219283 A1 | 8/2013 | Ryu et al. | |
| 2016/0085920 A1* | 3/2016 | Cyran | .................. G06F 19/322 705/3 |

FOREIGN PATENT DOCUMENTS

| | | |
|---|---|---|
| JP | 2007-108952 A | 4/2007 |
| JP | 2007-523393 A | 8/2007 |
| JP | 2008-090809 A | 4/2008 |
| JP | 2011-525649 A | 9/2011 |
| JP | 2011-253497 A | 12/2011 |
| JP | 2013-161301 A | 8/2013 |
| JP | 2013-171585 A | 9/2013 |
| WO | 2008/029774 A1 | 3/2008 |

OTHER PUBLICATIONS

Office Action dated Feb. 20, 2018, by the Japanese Patent Office in corresponding Japanese Patent Application No. 2017-125835, and an English Translation of the Office Action. (19 pages).

* cited by examiner

FIG. 3

SERVER REGISTRATION INFORMATION 23

| No. | SERVER NAME | SERVER TYPE | ADDRESS INFORMATION |
|---|---|---|---|
| 1 | A B C | STORAGE SERVER | http://www.abc.········ |
| 2 | X X X | STORAGE SERVER | http://www.xxx.········ |
| 3 | X Y Z | STORAGE SERVER | http://www.xyz.········ |
| 4 | B C D | STORAGE SERVER | http://www.bcd.········ |
| 5 | C D E | STORAGE SERVER | http://www.cde.········ |

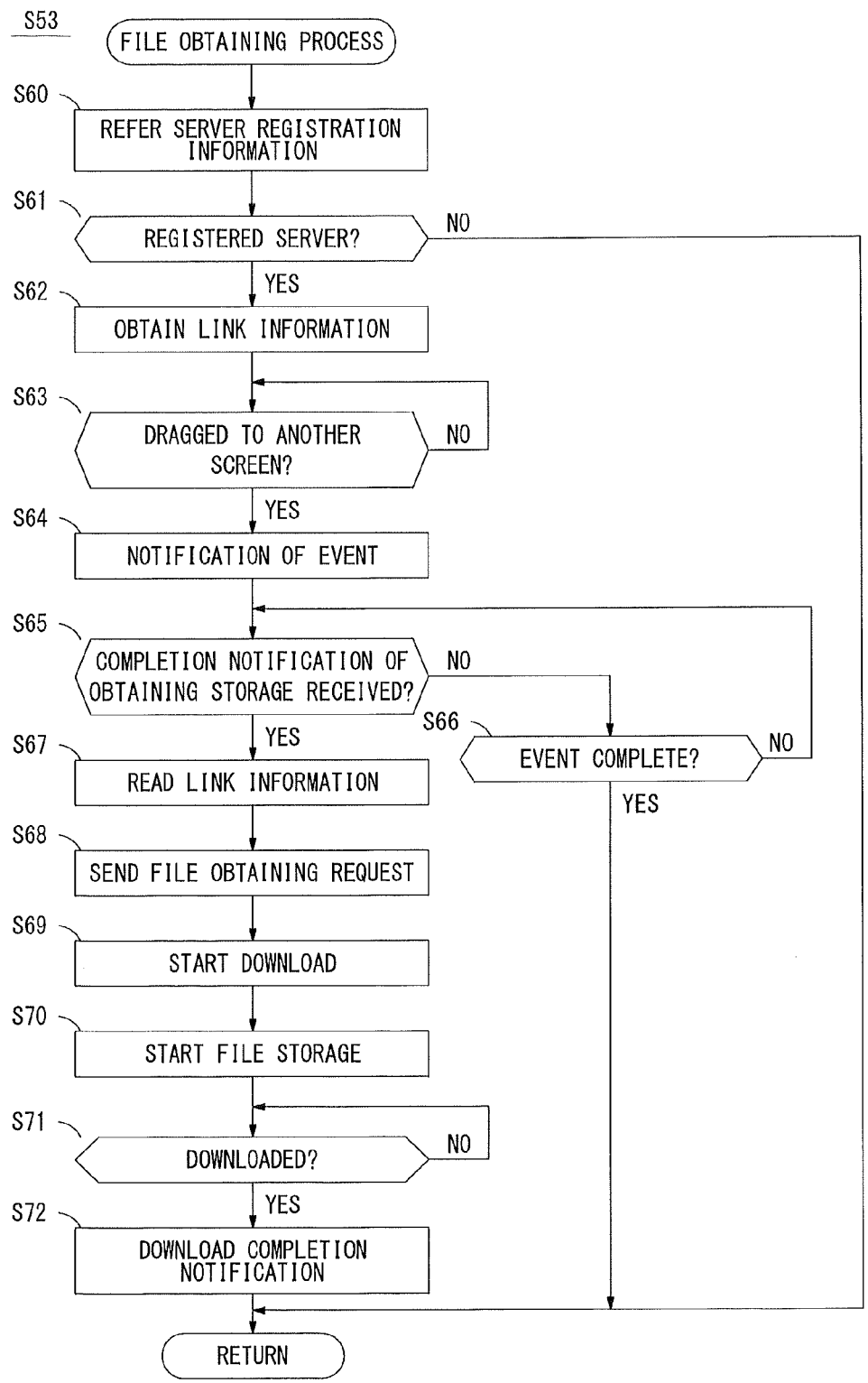

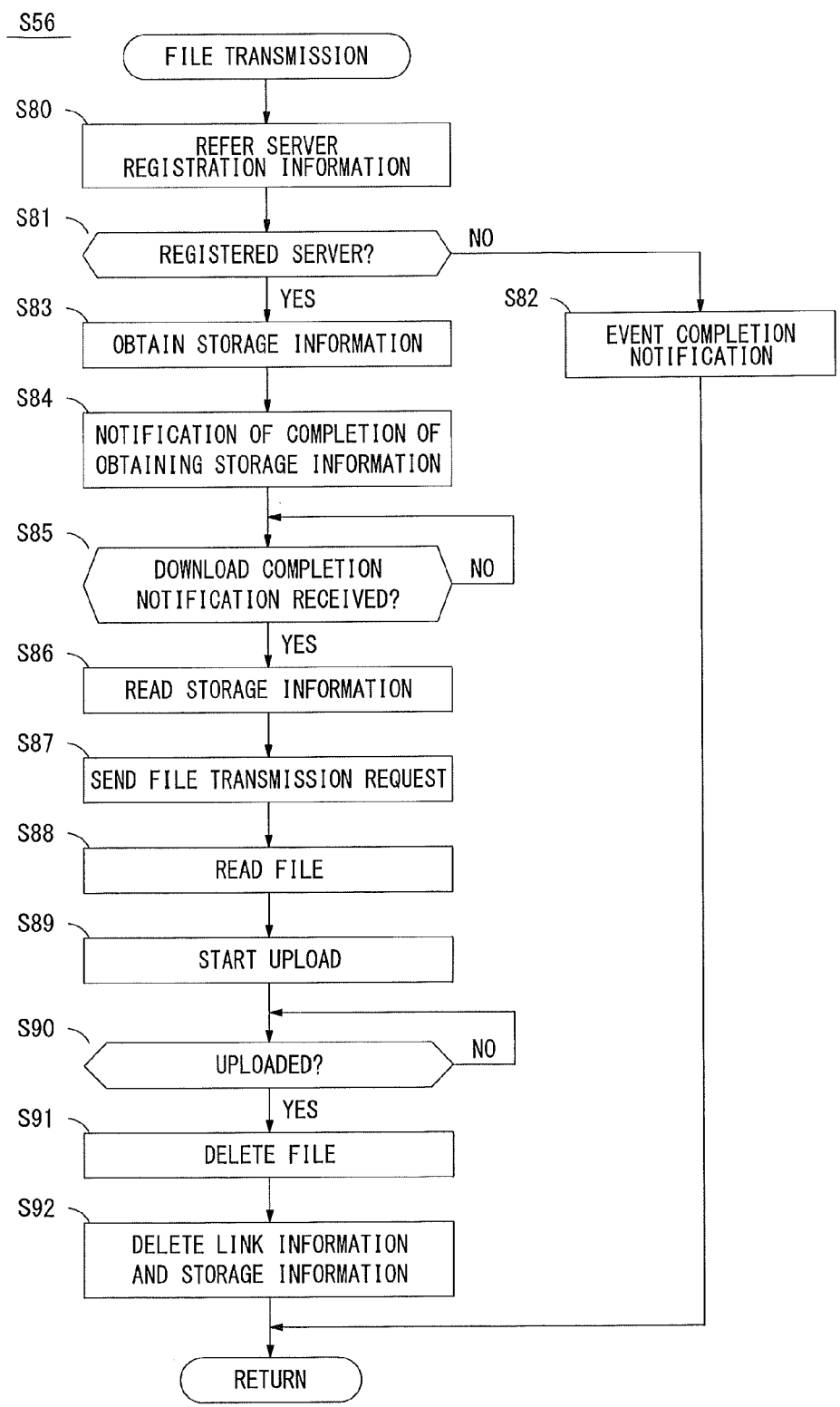

INFORMATION PROCESSING DEVICE, NON-TRANSITORY COMPUTER READABLE RECORDING MEDIUM AND INFORMATION PROCESSING METHOD FOR TRANSFERRING FILES FROM A FIRST SERVER TO A SECOND SERVER

This application is based on the application No. 2014-161021 filed in Japan, the contents of which are hereby incorporated by reference.

BACKGROUND OF THE INVENTION

Field of the Invention

The present invention relates to an information processing device, a non-transitory computer readable recording medium and an information processing method.

Description of the Background Art

Conventional systems which comprise a contents transfer server to mediate file transfer between a FTP (File Transfer Protocol) server and a mail server which are installed on an internet are introduced (as described for example in Japanese Patent Application Laid-Open No. 2007-108952). On such systems, the contents transfer server converts a protocol, thereby realizing the normal file transfer between the FTP server and the mail server. According to the aforementioned disclosed system, when a user would like to transfer a file between the FTP server and the mail server, he or she uses a terminal to run a browser and access an URL (Uniform Resource Locator) of the contents transfer server. A contents screen is then displayed based on web contents provided by the contents transfer server. Information such as a list of files stored in the FTP server or a list of files stored in the mail server is displayed on the contents screen. The user may give an instruction such as migration of the file between the FTP server and the mail server on the contents screen displayed by a browser. In response to receiving the instruction, a command based on the instruction is sent to the contents transfer server. In response to receiving the command from the terminal, the contents transfer server downloads or uploads the file from or to the respective FTP server and mail server. The contents transfer server is then allowed to mediate the file transfer between the multiple servers which have different protocols. To be more specific, the conventional system allows the contents transfer server to interpret the user instruction and realize the automatic file transmission between the multiple servers in response to receiving the user operation such as drag-and-drop into the contents screen obtained from the contents transfer server by the browser.

The above-described conventional system requires installation of the contents transfer server to mediate the file transfer between the multiple servers. When the user does not have the access to the contents transfer server, he or she is not allowed to realize the file transfer between the multiple servers with easy operation.

It is required to realize the file transfer between the multiple servers with relatively easy operation without installation of the contents transfer server. In this case, the most likely subject to be added a file transfer function between the multiple servers is the browser which is run based on the user instruction. It is assumed, for example, the user gives an instruction to run the browser and access two servers, a first storage server and a second storage server. Moreover, a first contents screen showing web contents provided by the first storage server and a second contents screen showing web contents provided by the second storage server are displayed at the same time. In this case, if a desired file is allowed to be moved from the first storage server to the second storage server by drag-and-drop from the first contents screen into the second contents screen, this improves usefulness.

The browser, however, is just displaying the web contents provided by the respective first storage server and second storage server. Hence, the browser is not obtaining none of information relating to the substantial files managed at each of the first storage server and second storage server. In response to detecting an operation to select the file shown on the contents screen, the browser interprets that the web content such as an icon image like file icon or a character string like a file name is simply selected. As a result, the browser is not capable of transferring the file managed at the server to another server.

SUMMARY OF THE INVENTION

The present invention is intended to solve the above conventional problems. Thus, the present invention is intended to provide an information processing device, a non-transitory readable recording medium and an information processing method capable of realizing file transfer between multiple servers relatively easily with a function of a browser without installation of a dedicated server such as a contents transfer server.

First, the present invention is directed to an information processing device.

According to an aspect of the information processing device, the information processing device comprises: a display part on which a variety of information is displayed; a manipulation part that receives a user operation; a browser that displays a contents screen on which web contents are laid out on the display part; a link information obtaining part that obtains link information to a file corresponding to a selected web content in response to detecting a selecting operation of at least one of the web contents on a first contents screen via the manipulation part when the browser is displaying the multiple contents screens including the first contents screen on which the web contents obtained from a first storage server are laid out and a second contents screen on which the web contents obtained from a second storage server are laid out on the display part; a storage information obtaining part that obtains storage information of the second storage server corresponding to a designated display area in response to detecting a designating operation of the display area of the web content on the second contents screen via the manipulation part after the link information is obtained by the link information obtaining part; a file obtaining part that downloads and obtains the file corresponding to the web content selected with the selecting operation from the first storage server based on the link information obtained by the link information obtaining part after the storage information is obtained by the storage information obtaining part; and a file transmitting part that sends the file obtained by the file obtaining part to the second storage server based on the storage information obtained by the storage information obtaining part, thereby uploading the file.

Second, the present invention is directed to a non-transitory computer readable recording medium storing a browser program to be executed by an information processing device including a display part on which a variety of information is displayed and a manipulation part receiving a user operation.

According to an aspect of the non-transitory computer readable recording medium, execution of the browser program by the information processing device causing the information processing device to execute the steps of: (a) obtaining link information to a file corresponding to a selected web content in response to detecting a selecting operation of at least one of the web contents on a first contents screen via the manipulation part when the browser is displaying the multiple contents screens including the first contents screen on which the web contents obtained from a first storage server are laid out and a second contents screen on which the web contents obtained from a second storage server are laid out on the display part; (b) obtaining storage information of the second storage server corresponding to a designated display area in response to detecting a designating operation of the display area of the web content on the second contents screen via the manipulation part after the link information is obtained in the step (a); (c) downloading and obtaining the file corresponding to the web content selected with the selecting operation from the first storage server based on the link information obtained in the step (a) after the storage information is obtained in the step (b); and (d) sending the file obtained in the step (c) to the second storage server based on the storage information obtained in the step (b), thereby uploading the file.

Third, the present invention is directed to an information processing method performed on an information processing device including a display part on which a variety of information is displayed and a manipulation part receiving a user operation.

According to an aspect of the information processing method, the information processing method comprises the steps of: (a) running a browser that displays a contents screen on which web contents are laid out on the display part; (b) obtaining link information to a file corresponding to a selected web content in response to detecting a selecting operation of at least one of the web contents on a first contents screen via the manipulation part when the browser is displaying the multiple contents screens including the first contents screen on which the web contents obtained from a first storage server are laid out and a second contents screen on which the web contents obtained from a second storage server are laid out on the display part; (c) obtaining storage information of the second storage server corresponding to a designated display area in response to detecting a designating operation of the display area of the web content on the second contents screen via the manipulation part after the link information is obtained in the step (b); (d) downloading and obtaining the file corresponding to the web content selected with the selecting operation from the first storage server based on the link information obtained in the step (b) after the storage information is obtained in the step (c); and (e) sending the file obtained in the step (d) to the second storage server based on the storage information obtained in the step (c), thereby uploading the file.

BRIEF DESCRIPTION OF THE DRAWINGS

FIG. 3 shows an example of server registration information;
FIG. 16 is a flow diagram explaining an exemplary detailed sequential procedure of a file obtaining process;
and
FIG. 17 is a flow diagram explaining an exemplary detailed sequential procedure of a file transmission.

DESCRIPTION OF THE PRESENT PREFERRED EMBODIMENTS

Figure 1:
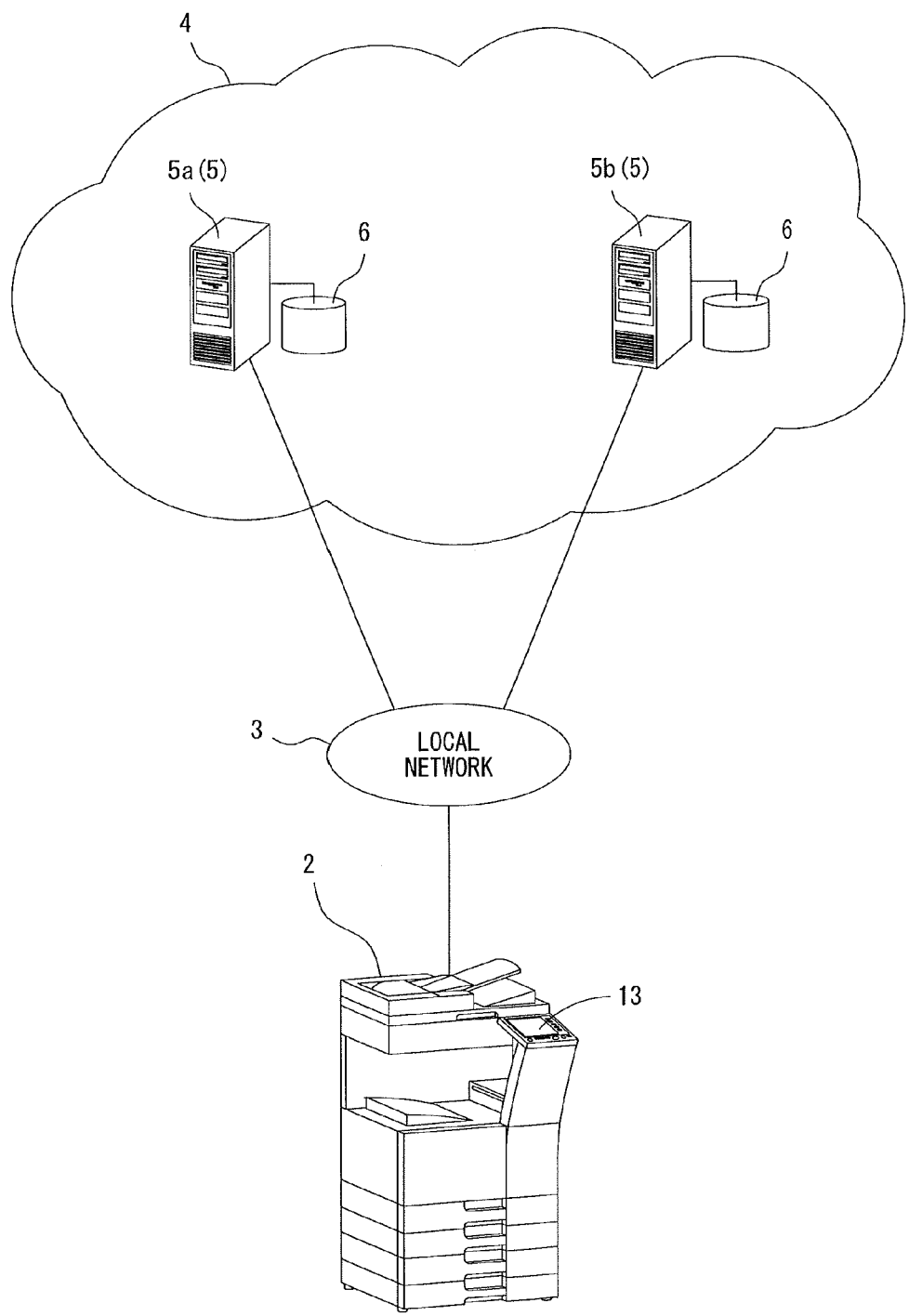
FIG. 1 shows an exemplary configuration of an information processing system.

Preferred embodiments of the present invention are described in detail below with reference to figures. In the description given below, those elements which are shared in common among figures are represented by the same reference numerals, and these elements are not discussed repeatedly for the same description.

First Preferred Embodiment

FIG. 1 shows an exemplary configuration of an information processing system 1 of the first preferred embodiment of the present invention. The information processing system 1 comprises an information processing device 2 constructed by one of MFPs (Multi-functional Peripherals). The information processing device 2 is equipped with functions including a copy function, a scan function, a printer function a box function, a fax function and a browser function. The information processing device 2 is connected to a local network 3 such as LAN (Local Area Network). The local network 3 is connected to a cloud 4 such as an Internet.

Multiple storage servers 5 are installed on the cloud 4. Each storage server 5 includes a storage 6 which stores and manages electronic files (hereafter, simply "file") such as document data and/or image data. Each storage server 5 provides a storage service over the Internet. The storage server 5 generates a file list screen of the files stored and managed at the storage 6 as a web page described in a language such as HTML (HyperText Markup Language). The storage server 5 provides the information processing device 2 with the generated web page over the internet. The substantial file managed at the storage server 5 is not included in the web page. The web page includes information like an icon image such as a file icon, a character string such as a file name and/or link information to a storage location of the substantial file as the web content.

In the example of FIG. 1, two storage servers, a first storage server 5a and a second storage server 5b, are installed on the cloud 4. The number of the storage servers 5 is not necessarily 2. More than 3 storage servers 5 may be installed. Also, the multiple storage servers 5 installed on the cloud 4 may be managed by a different service provider.

An operational panel 13 is provided with the information processing device 2 for users to make a variety of inputs. The user is allowed to activate the browser function on the information processing device 2 by making the inputs through a screen of the operational panel 13. The user gives instructions to the browser run on the information processing device 2, thereby gaining an access to each first storage server 5a and second storage server 5b. The user then is allowed to cause the contents screen to be displayed on the operational panel 13 by obtaining the web page generated by each storage server 5a and 5b.

Figure 2:
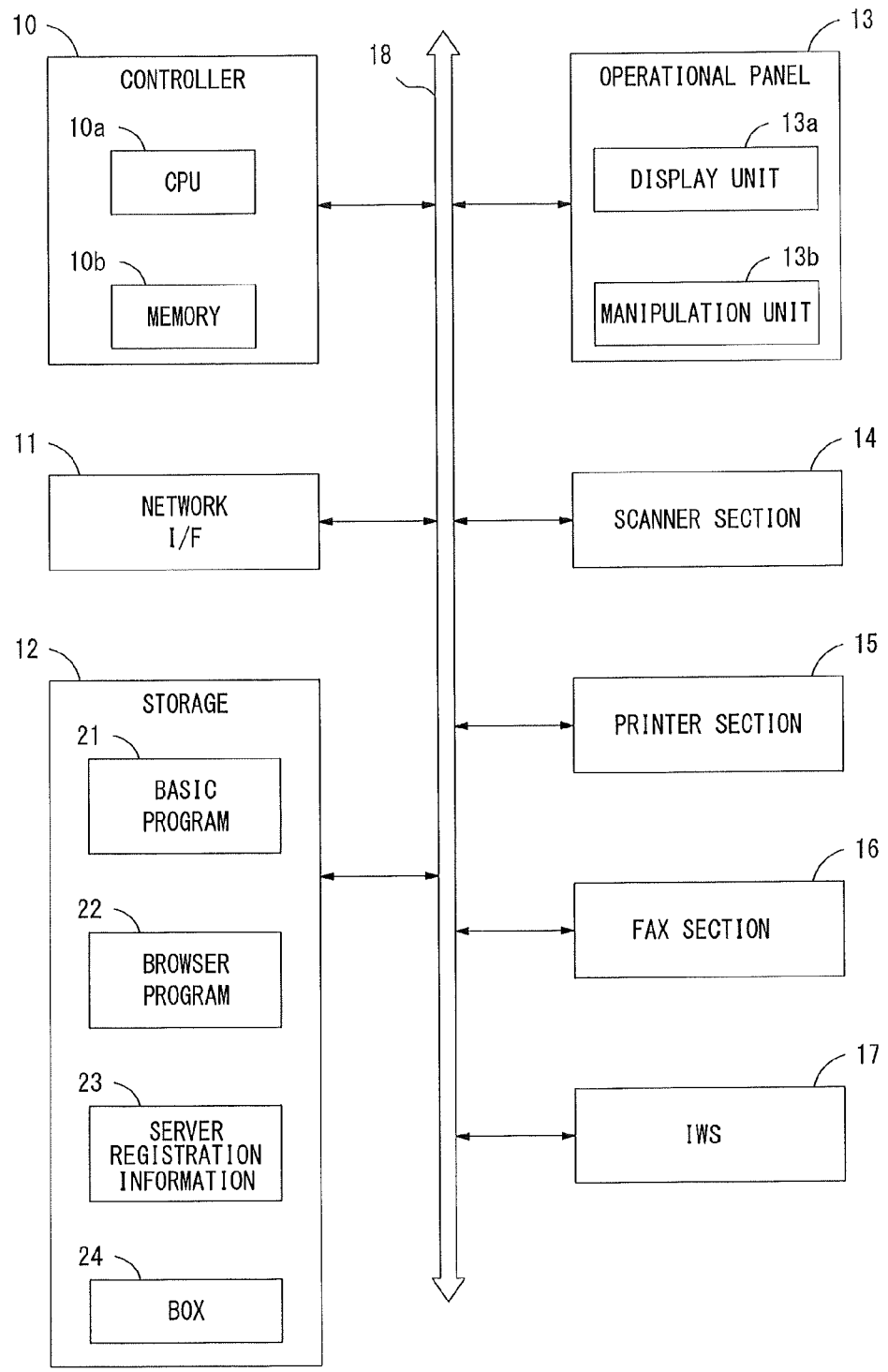
FIG. 2 is a block diagram showing an exemplary hardware configuration of an information processing device.

FIG. 2 is a block diagram showing an exemplary hardware configuration of the information processing device 2. The information processing device 2 includes a controller 10, a network interface 11, a storage 12, the operational panel 13, a scanner section 14, a printer section 15 and a fax section 16 and an internal web server (hereafter "IWS") 17. Each of the above-described parts is allowed to transmit and receive data with each other via a bus line 18.

The controller 10 controls overall operations of each aforementioned part. The controller 10 includes a CPU 10a and a memory 10b. The CPU 10a reads and executes a variety of programs stored in the storage 12. Data such as temporal data obtained in response to execution of the program by the CPU 10a is stored in the memory 10b.

The network interface 11 connects the information processing device 2 to the local network 3. The network interface 11 establishes wired or wireless connection to the local network 3, thereby communicating with each of the first storage server 5a and the second storage server 5b over the local network 3.

The storage 12 is formed from a nonvolatile storage device such as a hard disk drive (HDD), for instance. The storage 12 stores therein the variety of programs executed by the CPU 10a. In the example of FIG. 2, a basic program 21 and a browser program 22 of the variety of programs are shown. The basic program 21 is automatically read and executed by the CPU 10a after the information processing device 2 is powered on. The basic program 21 causes the controller 10 to serve as an operating system 28 which is described later. The browser program 22 is run based on the user instruction as the operating system 28 is running on the controller 10. The browser program 22 causes the controller 10 to serve as a browser 29 which is described later.

Server registration information 23 is stored in advance in the storage 12. The server registration information 23 is managed by the browser 29. Information relating to the multiple storage servers 5 such as the first storage server 5a and the second storage server 5b used by the information processing device 2 is registered in advance as the server registration information 23. FIG. 3 shows an example of the server registration information 23. As shown in FIG. 3, a server name 5, a server type and address information such as URL of each storage server 5 are registered in advance as the server registration information 23.

The storage 12 includes a BOX 24 used with the BOX function. The BOX 24 is a storage region in which a file such as a document and an image is stored. The BOX 24 is assigned to each user or each group, for instance.

The operational panel 13 includes a display unit 13a and a manipulation unit 13b. The display unit 13a formed from a device such as a color liquid crystal display, for example, is capable of displaying various types of screens. The manipulation unit 13b formed with parts such as touch panel keys arranged on the screen of the display area of the display unit 13a and push-button keys arranged around the display area of the display unit 13b, for example, receives inputs by the user.

The scanner section 14 optically reads a document placed by the user and generates image data. The scanner section 14 becomes operative when the scan function, the copy function or the fax function is selected by the user to generate the image data.

The printer section 15 produces a printed output by forming images on a sheet material such as a printing sheet based on the received image data. The printer section 15 becomes operative when the print function or the copy function is selected by the user to produce the printed output.

The fax section 16 transmits and receives fax data over public phone lines, which are not shown in FIG. 2. After the fax data is received by the fax section 16, for example, the received fax data is output to the printer section 15 so that the printed output is produced based on the fax data.

The IWS 17 generates a screen to display the variety of information in the information processing device 2 as a web page. It is assumed, for example, the browser is run on a personal computer connected to the local network 3, and the browser accesses the information processing device 2. In this case, the IWS 17 generates the screen to display the variety of information in the information processing device 2 as the web page, and outputs the generated web page to the browser, thereby displaying it. When the browser 29 is run on the controller 10, the IWS 17 is capable of generating the similar web page and outputting it to the browser 29.

Figure 4:
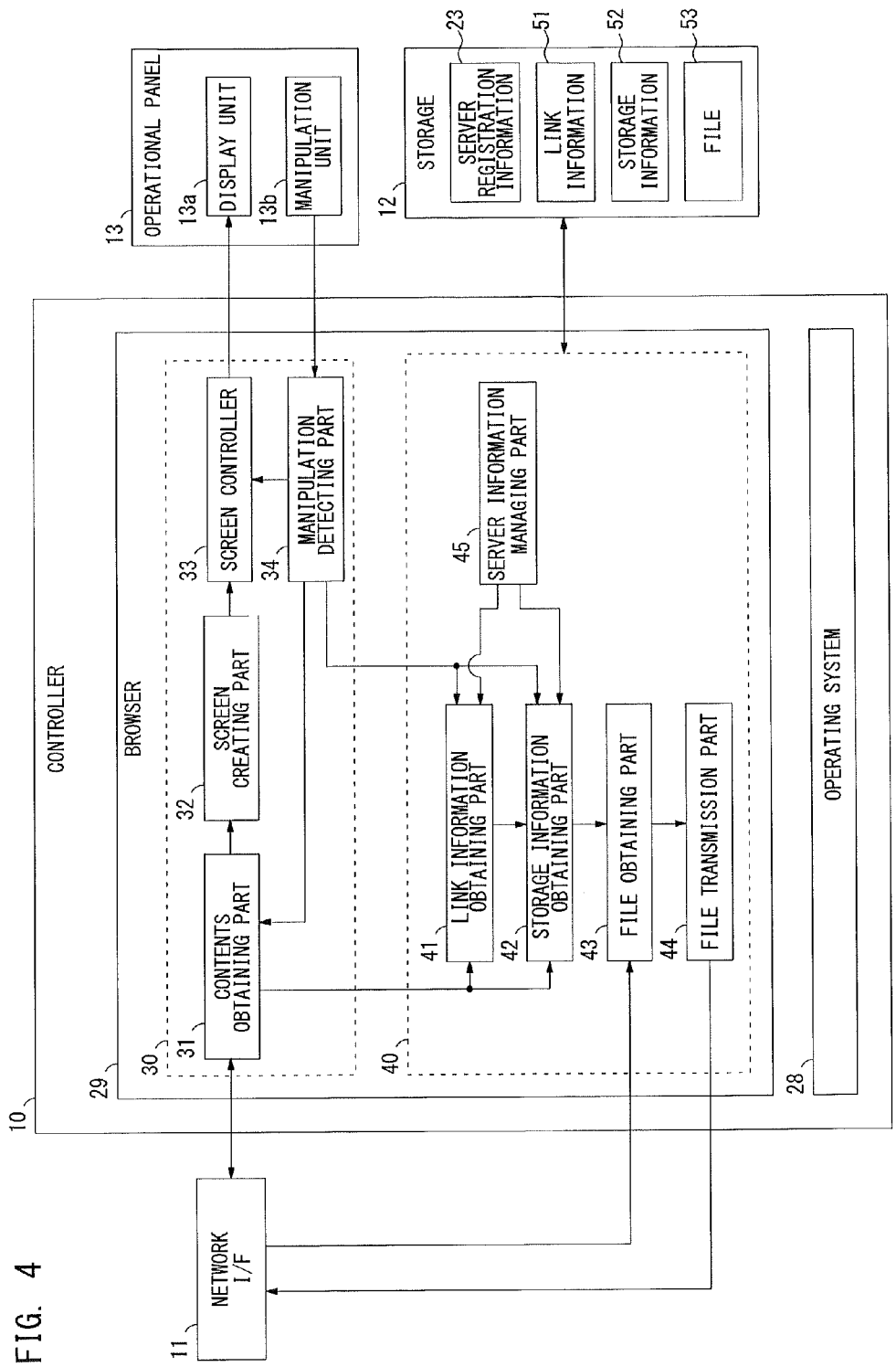
FIG. 4 is a block diagram showing an exemplary functional configuration of a controller.

FIG. 4 is a block diagram showing an exemplary functional configuration of the controller 10. The controller 10 reads and executes the basic program 21, thereby serving as the operating system 28. In response to detecting the user instruction to run the browser program 22 through the operational panel 13, the operating system 28 reads and executes the browser program 22 in the storage 12. Thus, the controller 10 serves as the browser 29.

The browser 29 includes a display controller 30 and a file transfer controller 40 as illustrated in FIG. 4. The display controller 30 obtains and lays out the web contents, thereby creating the contents screen and displaying the created contents screen on the display unit 13a. The file transfer controller 40 controls the file transfer between the multiple servers. The display controller 30 is one of basic functions equipped with the general browser. On the other hand, the file transfer controller 40 is an advanced function which is added to the general browser, for instance.

The display controller 30 includes a contents obtaining part 31, a screen creating part 32, a screen controller 33 and a manipulation detecting part 34.

The contents obtaining part 31 accesses the URL designated by the user, and obtains the web page described in the language such as HTML from the URL. The web page obtained by the contents obtaining part 31 contains various types of web contents. It is assumed, for example, the contents obtaining part 31 accesses the first storage server 5a or the second storage server 5b. In this case, the contents obtaining part 31 obtains the web page containing information such as the icon image like the file icon, the character string like the file name and/or the link information to the storage location of the substantial file as the web contents.

The screen creating part 32 places the web contents obtained by the contents obtaining part 31 at a display position specified by the language such as HTML, thereby creating the contents screen to display on the display unit 13a. The contents obtaining part 31 gains an access to the first storage server 5a or the second storage server 5b, and obtains the web contents. In this case, the screen creating part 32 places the web contents including the information such as the icon image like the file icon, the character string like the file name and/or the link information to the storage location of the substantial file at the right position, thereby creating a file list screen of the files managed at the first storage server 5a or the second storage server 5b as the contents screen.

The screen controller 33 displays the contents screen created by the screen creating part 32 on the display unit 13a. The screen controller 33 of the first preferred embodiment is capable of displaying the multiple contents screens on the display unit 13a. The screen controller 33 assigns a tab to each of the multiple contents screens and manages each of the multiple contents screens as a tab screen. The screen controller 33 displays the contents screen of one of the tabs selected by the user in front of another contents screen so that one contents screen is displayed on the display unit 13a.

The manipulation detecting part 34 detects user operations performed on the manipulation unit 13b. After the user makes the operation to designate the URL, the manipulation detecting part 34 notifies the contents obtaining part 31 of the URL. As a result, the contents obtaining part 31 is allowed to access the URL designated by the user and obtain the web page described in the language such as HTML from the URL. The manipulation detecting part 34 may detect the user operation to activate a new tab. In this case, the manipulation detecting part 34 gives an instruction to the screen controller 33 to display the contents screen of the new tab. The screen controller 33 then displays the contents screen to which the new tab is assigned on the display unit 13a. The multiple contents screens may be displayed by the screen controller 33. In such a case, the manipulation detecting part 34 detects the user operation to select the tab. After detecting the user operation to select the tab, the manipulation detecting part 34 gives the instruction to switch the contents screen displayed at the front of the display unit 13a to the screen controller 33. The screen controller 33 then displays the contents screen corresponding to the tab selected by the user at front of another contents screen.

The browser 29 gains accesses to both the first storage server 5a and the second storage server 5b at the same time so that the first contents screen and the second contents screen are displayed on the display unit 13a at the same time. The web contents obtained by the first storage server 5a are laid out on the first contents screen, and the web contents obtained by the second storage server 5b are laid out on the second contents screen. The browser 29 is allowed to display either the first contents screen or the second contents screen at the front based on the user operation.

Figure 5A:
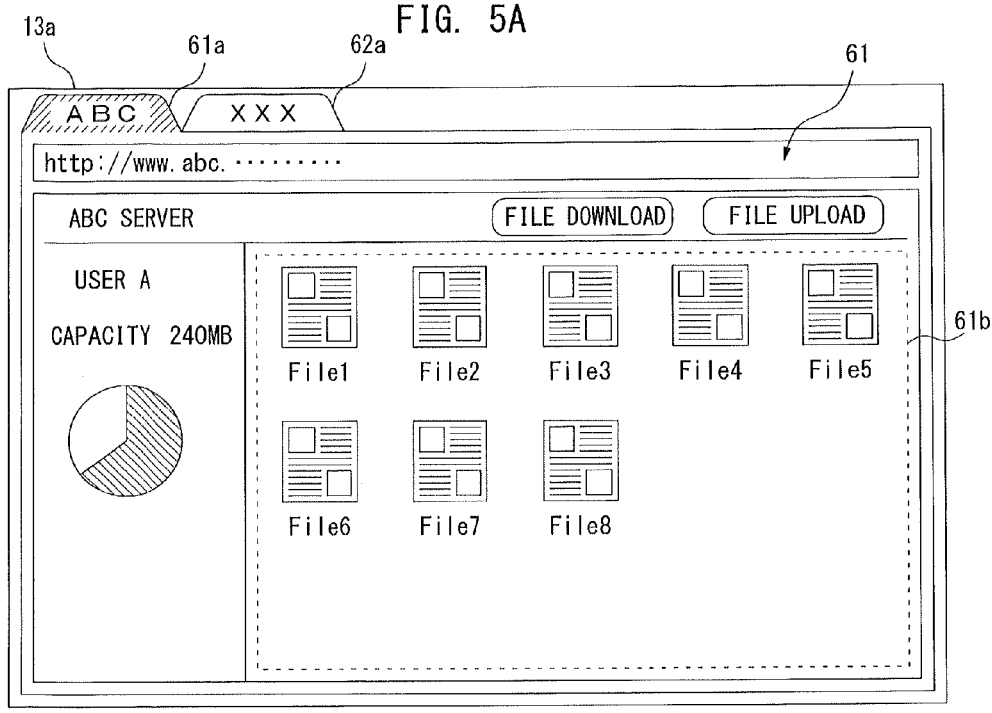
FIGS. 5A and 5B are examples of displays when a first contents screen and a second contents screen are displayed at the same time.
Figure 5B:
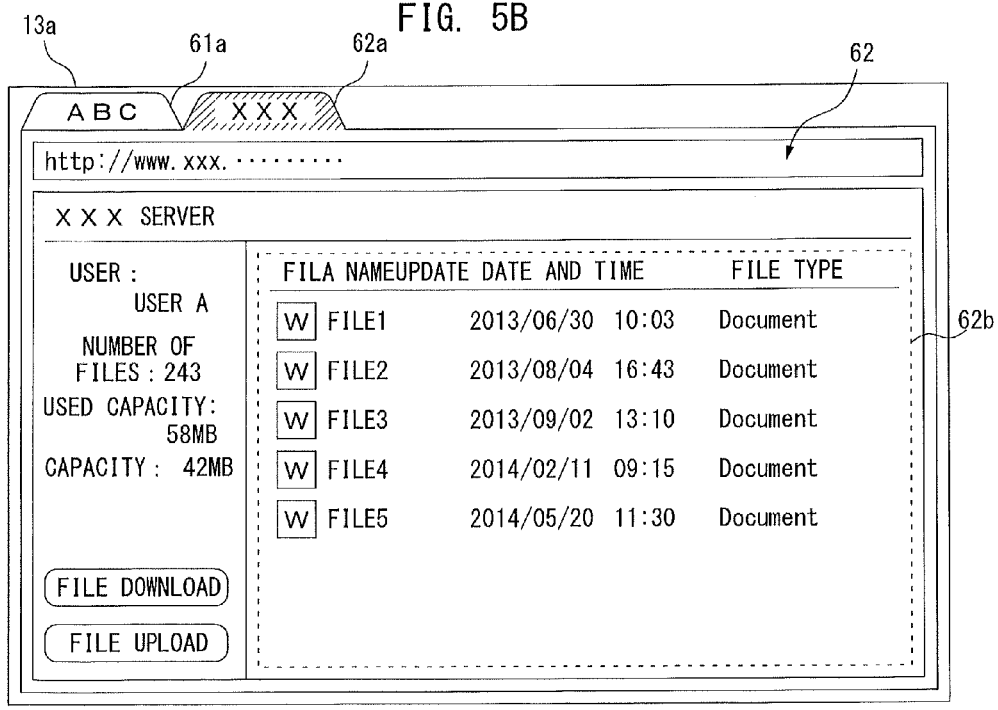

FIGS. 5A and 5B are examples of displays when a first contents screen 61 and a second contents screen 62 are displayed on the display unit 13a at the same time. FIG. 5A shows an example when the first contents screen 61 on which the web contents obtained from the first storage server 5a are laid out is displayed at the front. FIG. 5B shows an example when the second contents screen 62 on which the web contents obtained from the second storage server 5b are laid out is displayed at the front.

The first contents screen 61 shown in FIG. 5A is displayed based on the web contents obtained from the first storage server 5a, for example. A tab 61a is assigned to the first contents screen 61. The first contents screen 61 includes a brachymorphic display area 61b in which a list of the files stored in the first storage server 5a is displayed. The display area 61b shows the files stored in a folder accessible by the user who is using the information processing device 2 in the first storage server 5a in a list form. In the example of FIG. 5A, icon images of 8 files, "File 1" to "File 8," are shown in the list form. The link information to access the storage location of the substantial file corresponding to each icon image is assigned to each of the 8 icon images. Also, the link information to access the folder (storage location) in which each file of the list is stored is assigned to the display area 61b showing the list of the files. The link information, however, is configured not to be displayed on the first contents screen 61.

In the example of FIG. 5A, a tab 62a corresponding to the second contents screen 62 is displayed next to the tab 61a corresponding to the first contents screen 61. The tab 62b corresponding to the second contents screen 62 is behind the tab 61a corresponding to the first contents screen 61. It is assumed, for example, the user taps the tab 62a to select the tab 62a. In this case, the screen controller 33 switches the screen on the display unit 13a from the state shown in FIG. 5A to the state shown in FIG. 5B so that the second contents screen 62 is displayed at the front.

The second contents screen 62 shown in FIG. 5B is displayed based on the web contents obtained from the second storage server 5b, for instance. The second contents screen 62 includes a brachymorphic display area 62b in which a list of the files stored in the second storage server 5b is displayed. The display area 62b shows the files stored in a folder accessible by the user who is using the information processing device 2 in the second storage server 5b in a list form. In the example of FIG. 5B, character strings showing the file names of 5 files, "FILE 1" to "FILE 5," are shown in a list form. The link information to access the storage location of the substantial file corresponding to each file name is assigned to each of the character strings showing the respective names of the 5 files. Also, the link information to access the folder (storage location) in which each file of the list is stored is assigned to the display area 62b showing the list of the files. The link information, however, is configured not to be displayed on the second contents screen 62.

Referring back to FIG. 4, in response to detecting the user operation, the aforementioned manipulation detecting part 34 is configured to output operation information based on the detected operation to the file transfer controller 40. The operation information thereby output includes information such as information relating to the server from which the contents screen on which the user made the operation is obtained (for example, the URL), an operated position where the user made the operation, the web contents that are located on the operated position and/or the display area covering the operated position.

The file transfer controller 40 becomes operative when the above-described display controller 30 displays the multiple contents screens. It is assumed, for example, the user makes the operation to move the web contents (for instance, drag-and-drop) from one of the contents screens into another contents screen. In such a case, the file transfer controller 40 controls to mediate the file transfer between the multiple servers based on the user operation. The file transfer controller 40 includes a link information obtaining part 41, a storage information obtaining part 42, a file obtaining part 43, a file transmission part 44 and a server information managing part 45.

When the user selects the web content such as the icon image or the file name on the contents screen, the link information obtaining part 41 obtains link information 51 assigned to the selected web content. It is assumed, for example, the first contents screen 61 and the second contents screen 62 are displayed on the display unit 13*a* by the display controller 30 as described above. The web contents obtained from the first storage server 5*a* are laid out on the first contents screen 61, and the web contents obtained from the second storage server 5*b* are laid out on the second contents screen 62. At least one of the web contents included in the first contents screen 61 may be selected by the user as the first and the second contents screens 61 and 62 are displayed. The link information obtaining part 41 then obtains the link information 51 obtained from the first storage server 5*a* by the contents obtaining part 31. The link information 51 is assigned to the web content selected by the user.

The user selects the web content by, for instance, long taps at least one icon image displayed on the first contents screen 61 with his or her fingertip. In response to detecting such selecting operation, the manipulation detecting part 34 outputs operation information including information relating to the web content (icon image) selected by the user to the link information obtaining part 41. The link information obtaining part 41 then obtains the link information 51 corresponding to the web content from the contents obtaining part 31 based on the operation information received from the manipulation detecting part 34. After obtaining the link information 51, the link information obtaining part 41 temporarily stores the obtained link information 51 in the storage 12 as shown in FIG. 4.

The way of obtaining the link information 51 by the link information obtaining part 41 is not always obtained from the contents obtaining part 31. The link information obtaining part 41 may obtain the link information 51 from the screen creating part 32 or the screen controller 33. Alternatively, the link information obtaining part 41 is allowed to obtain the link information 51 from the first storage server 5*a* by accessing the first storage server 5*a* via the network interface 11. When the link information obtaining part 41 directly obtains the link information 51 from the first storage server 5*a* over the internet, the link information 51 may not be obtained efficiently because of the network load, for example. The link information obtaining part 41 therefore preferably obtains the link information 51 obtained in advance by the contents obtaining part 31.

Figure 6A:
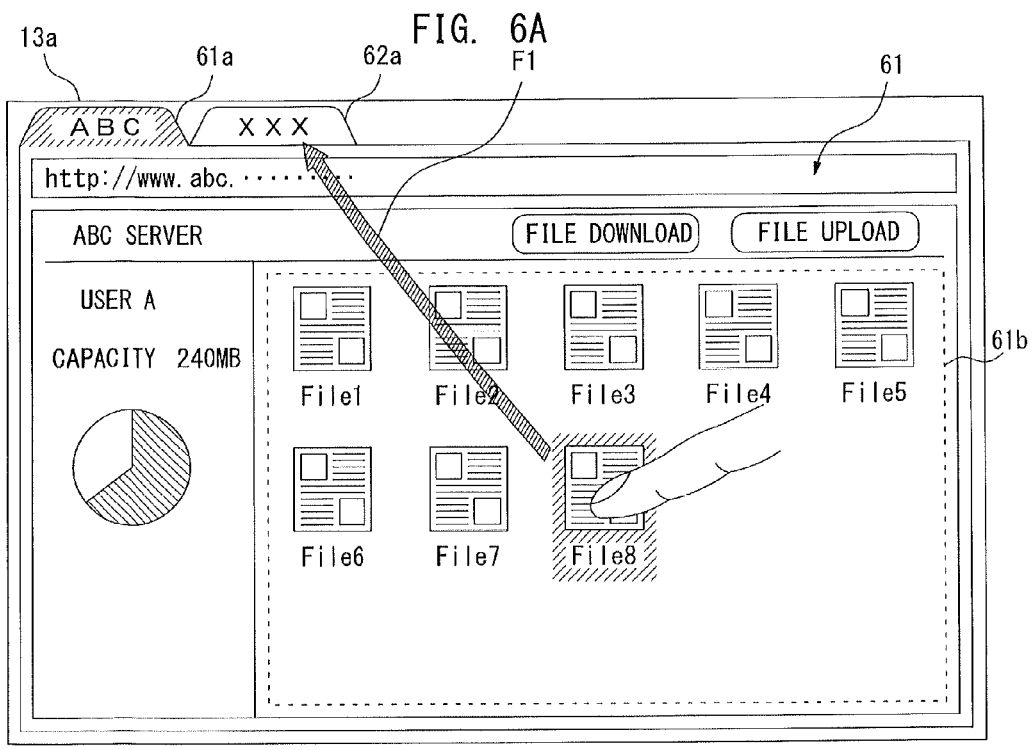
FIGS. 6A and 6B are an example of a user operation of drag-and-drop from one of the multiple contents screen into another.
Figure 6B:
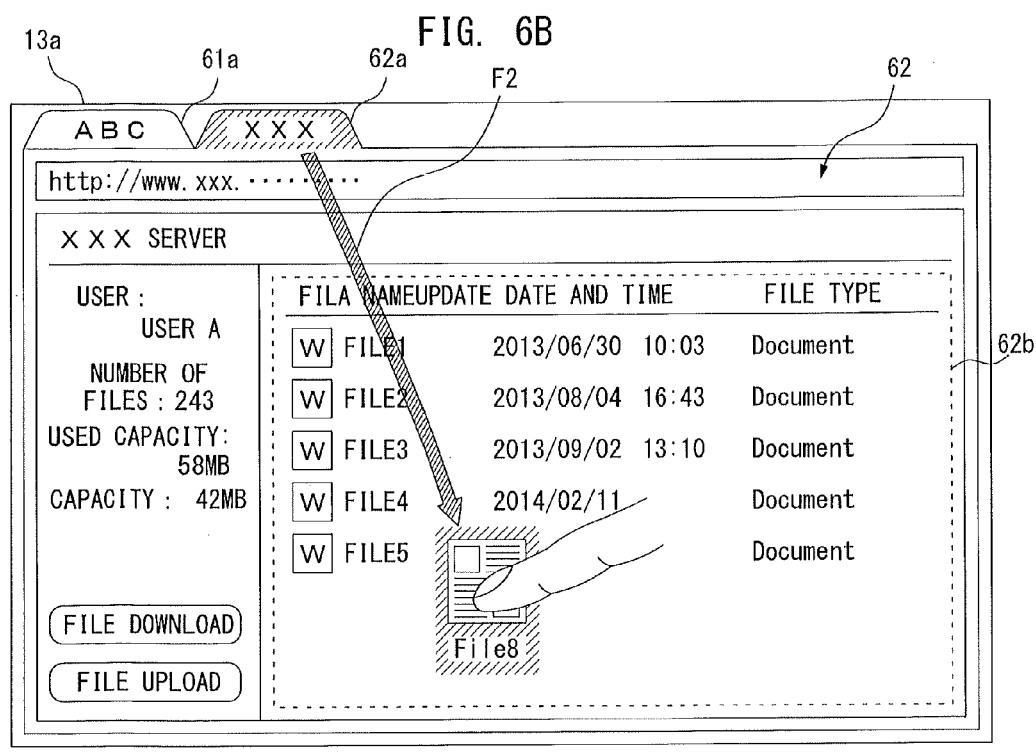

FIGS. 6A and 6B are an example of the user operation of drag-and-drop from one of the multiple contents screen 61 and 62 into another. The user selects the web content such as the icon image by log tapping it. The web content is then allowed to be moved corresponding to dragging by the user. The user moves his or her fingertip, thereby dragging the tapped web content. FIG. 6A shows an example when the web content corresponding to "File 8" is selected by the user. After the user selects the web content corresponding to "File 8," he or she moves his or her fingertip as illustrated with an arrow F1. The web content corresponding to "File 8" is then moved. The user moves his or her fingertip to near the tab 62*a* assigned to the second contents screen 62. In this case, the manipulation detecting part 34 determines the dragging as the selecting operation of the tab 62*a*, and gives the instruction to the screen controller 33 to display the second contents screen 62 at the front. Hence, the screen displayed on the display unit 13*a* is switched from the screen of FIG. 6A to FIG. 6B. In this case, the web content of "File 8" is kept being dragged.

After the second contents screen 62 is displayed, the user may move and drop the web content of "File 8" into the display area 62*b* of the list of the file as shown in FIG. 6B with an arrow F2. The manipulation detecting part 34 then determines the dropping as the designating operation of the storage of the file (location to which the file is moved or copied). The manipulation detecting part 34 outputs the operation information including the information relating to the display area 62*b* into which the user dropped the web content to the storage information obtaining part 42.

The storage information obtaining part 42 is brought into operation after the link information 51 is obtained by the link information obtaining part 41. In response to receiving the operation information corresponding to the dropping from the manipulation detecting part 34, the storage information obtaining part 42 obtains storage information 52 corresponding to the display area 62*b* into which the user dropped the web content from the contents obtaining part 31. The storage information obtaining part 42 obtains address information such as the URL which is currently being displayed as the second contents screen 62, for example, as the storage information 52. The link information to the folder in which the substantial file is stored may be assigned to the display area 62*b* into which the user dropped the web content. In this case, the storage information obtaining part 42 may obtain the link information as the storage information 52. After obtaining the storage information 52, the storage information obtaining part 42 temporarily stores the obtained storage information 52 in the storage 12 as shown in FIG. 4.

The way of obtaining the storage information 52 by the storage information obtaining part 42 is not always obtained from the contents obtaining part 31. The storage information obtaining part 42 may obtain the storage information 52 from the screen creating part 32 or the screen controller 33. Alternatively, the storage information obtaining part 42 is allowed to obtain the storage information 52 from the second storage server 5*b* by accessing the second storage server 5*b* via the network interface 11. When the storage information obtaining part 42 obtains the storage information 52 from the second storage server 5*b* over the internet, the storage information 52 may not be obtained efficiently because of the network load, for example. The storage information obtaining part 42 therefore preferably obtains the storage information 52 obtained in advance by the contents obtaining part 31.

After the storage information 52 is obtained by the storage information obtaining part 42, the file obtaining part 43 becomes operative next. The file obtaining part 43 reads the link information 51 in the storage 12 obtained by the link information obtaining part 41, and accesses the first storage server 5*a* based on the read link information 51. The file obtaining part 43 downloads and obtains a substantial file 53 corresponding to the web content selected by the user from the first storage server 5*a*. To be more specific, the file obtaining part 43 is configured to directly obtain the substantial file such as the document or the image which is not included in the first contents screen 61 from the first storage server 5*a*. In response to obtaining the file 53 corresponding to the web content selected by the user from the first storage server 5*a*, the file obtaining part 43 temporarily stores the obtained file 53 in the storage 12 as illustrated in FIG. 4.

After the file 53 is obtained by the file obtaining part 43, the file transmission part 44 becomes operative next. The file transmission part 44 reads the storage information 52 in the storage 12 obtained by the storage information obtaining part 42, and accesses the second storage server 5b based on the read storage information 52. The file transmission part 44 reads the substantial file 53 in the storage 12, and sends the file 53 to a storage region (folder) corresponding to the display area 62b designated by the user, thereby uploading it. As a result, the file 53 obtained from the first storage server 5a is stored in the storage region designated by the user. After the file transmission to the second storage server 5b, the file transfer from the first storage server 5a to the second storage server 5b is complete. In response to the file transfer completion, the file transmission part 44 deletes the link information 51, the storage information 52 and the file 53 in the storage 12. As a result of this deletion, the storage region in which the link information 51, the storage information 52 and the file 53 are stored in the storage 12 is opened.

Figure 7:
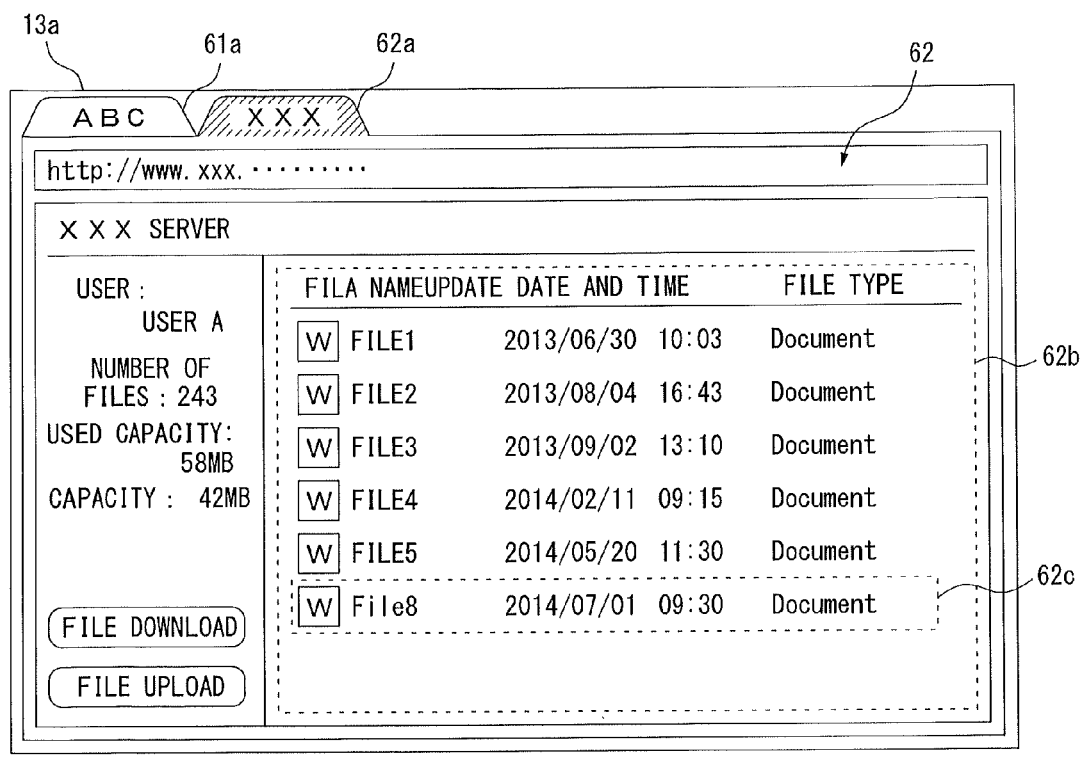
FIG. 7 shows an example of the second contents screen after file transfer.

The file obtaining part 43 may notify the display controller 30 of the completion of the file transfer after the file transfer is complete, and the display of the second contents screen 62 may be brought up-to-date. After the second contents screen 62 is brought up-to-date by the display controller 30, the second contents screen 62 is switched from the state shown in FIG. 6B to FIG. 7. A web content 62c such as the file name corresponding to the file which is additionally stored in the second storage server 5b through the file transfer is added to the second contents screen 62 of FIG. 7. The user is allowed to see that the file transfer has completed normally.

The server information managing part 45 manages the server registration information 23 in the storage 12, and provides the link information obtaining part 41 or the storage information obtaining part 42 with the server registration information 23 as required. It is assumed, for example, multiple contents screens are displayed on the display unit 13a by the display controller 30. Even in such a case, the screen obtained from the general web server such as an internet search site, for instance, may be displayed instead of the screen obtained from the storage server 5. If the user makes the selecting operation of the web content on the screen obtained from the general web server which is not equipped with the storage function, it is not necessary for the link information obtaining part 41 to obtain the link information 51. Even when the user drops into the screen obtained from the general web server to designate the storage, it is not necessary for the storage information obtaining part 42 to obtain the storage information 52.

When the selecting operation of the web content by the user is detected, the link information obtaining part 41 reads the server registration information 23 in the storage 12 via the server information managing part 45. The link information obtaining part 41 determines whether or not the contents screen on which the user made the selecting operation of the web content is the screen obtained from the storage server 5 which is registered in advance with the server registration information 23. The contents screen on which the user made the selecting operation of the web content may be the screen obtained from the storage server 5 registered in advance with the server registration information 23. In this case, the link information obtaining part 41 obtains the link information 51 assigned to the web content selected by the user. The contents screen on which the user made the selecting operation of the web content may not be the screen obtained from the storage server 5 registered in advance with the server registration information 23. In this case, the link information obtaining part 41 does not obtain the link information 51.

When the dropping by the user to designate the storage is detected, the storage information obtaining part 42 reads the server registration information 23 in the storage 12 via the server information managing part 45. The storage information obtaining part 42 determines whether or not the contents screen on which the user made the designating operation of the storage is the screen obtained from the storage server 5 which is registered in advance with the server registration information 23. The contents screen on which the user made the designating operation of the storage may be the screen obtained from the storage server 5 registered in advance with the server registration information 23. In this case, the storage information obtaining part 42 obtains the storage information 52 relating to the storage region selected by the user. The contents screen on which the user made the designating operation of the storage may not be the screen obtained from the storage server 5 registered in advance with the server registration information 23. In this case, the storage information obtaining part 42 does not obtain the storage information 52. The storage information obtaining part 42 deletes and discards the link information 51 obtained by the link information obtaining part 41 in the storage 12. As a result, the process by the file transfer controller 40 is back to the initial state. If the user selects the web content after that, the above-described process is performed again from the beginning.

Figure 8:
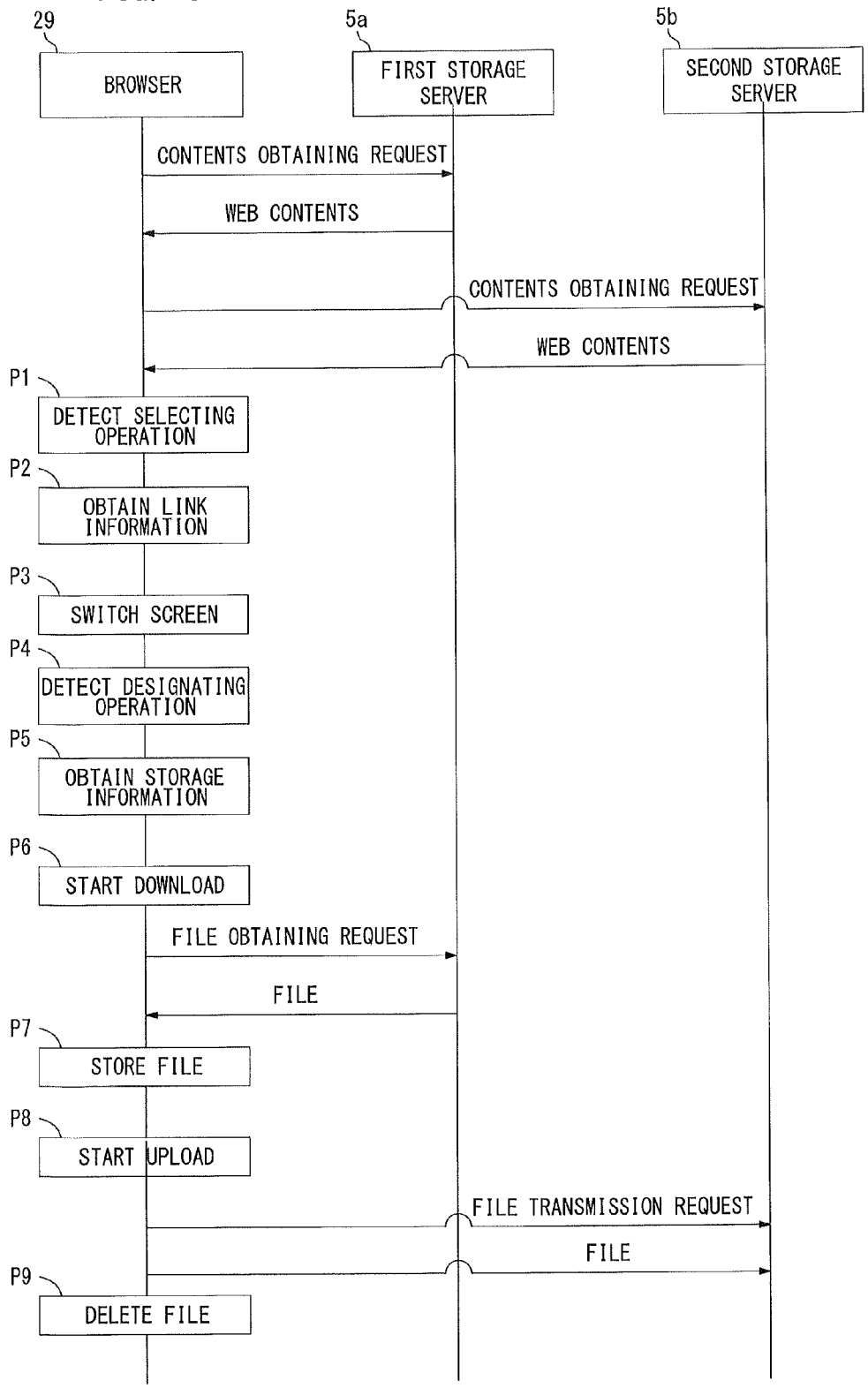
FIG. 8 is a flow diagram explaining an exemplary sequential procedure to transfer a file between the multiple servers by a browser.

FIG. 8 is a flow diagram explaining an exemplary sequential procedure to transfer the file between the multiple servers 5a and 5b by the browser 29 with the above-described configuration. The browser 29 run on the information processing device 2 sends a contents obtaining request to the first storage server 5a based on the user instruction, and obtains the web contents from the first storage server 5a. The browser 29 displays the first contents screen 61 as illustrated in FIG. 5A based on the web contents obtained from the first storage server 5a. The browser 29 then sends the contents obtaining request to the second storage server 5b based on the user instruction, and obtains the web contents from the second storage server 5b. The browser 29 displays the second contents screen 62 as illustrated in FIG. 5B based on the web contents obtained from the second storage server 5b. Thus, the multiple contents screens 61 and 62 are displayed on the display unit 13a at the same time.

In response to detecting the web content selecting operation by the user on the first contents screen 61 (process P1), the browser 29 obtains the link information 51 to the file corresponding to the selected web content (process P2). After detecting the selecting operation of the tab 62a by the user, the browser 29 switches the screen displayed on the display unit 13a from the first contents screen 61 to the second contents screen 62 (process P3). In response to detecting the designating operation of the storage by the user on the second contents screen 62 (process P4), the browser 29 obtains the storage information 52 of the second storage server 5b corresponding to the display area 62b on which the designating operation is made (process P5).

After obtaining both the link information 51 and the storage information 52, the browser 29 starts the process to download and obtain the substantial file 53 corresponding to the web content selected by the user from the first storage server 5a (process P6). To be more specific, the browser 29 sends the file obtaining request to the first storage server 5a based on the link information 51, and receives the substantial file 53 from the first storage server 5a. The browser 29 then stores the file 53 obtained from the first storage server 5a (process P7). After the download of the file 53, the browser 29 starts the upload of the file 53 to the second storage server 5b (process P8). More specifically, after sending the file transmission request to the second storage server 5b based on the storage information 52, the browser 29 sends the file 53. After upload to the second storage server 5b, the browser 29 deletes the file 53 in the storage 12 (process P9). At deleting the file 53, the browser 29 also deletes the link information 51 and the storage information 52 in the storage 12.

Through the above-described process, the file 53 stored in the first storage server 5a is transferred to the second storage server 5b. In the above-described process, the user is not required to press a button such as a download button on the first contents screen 61 to give the instruction to start the download of the file 53 or designate the storage of the downloaded file 53 for download of the file 53. Also, the user is not required to press a button such as an upload button on the second contents screen 62 to give the instruction to start the upload of the file 53 or designate the folder to which the file 53 is uploaded for upload of the file 53. To be more specific, the user makes a simple operation to move the web content on the first contents screen 61 to the second contents screen 62 so that the file 53 corresponding to the selected web content is automatically transferred to the second storage server 5b from the first storage server 5a. As a result, the operability in file transfer between the different servers 5a and 5b is extremely improved.

Figure 9:
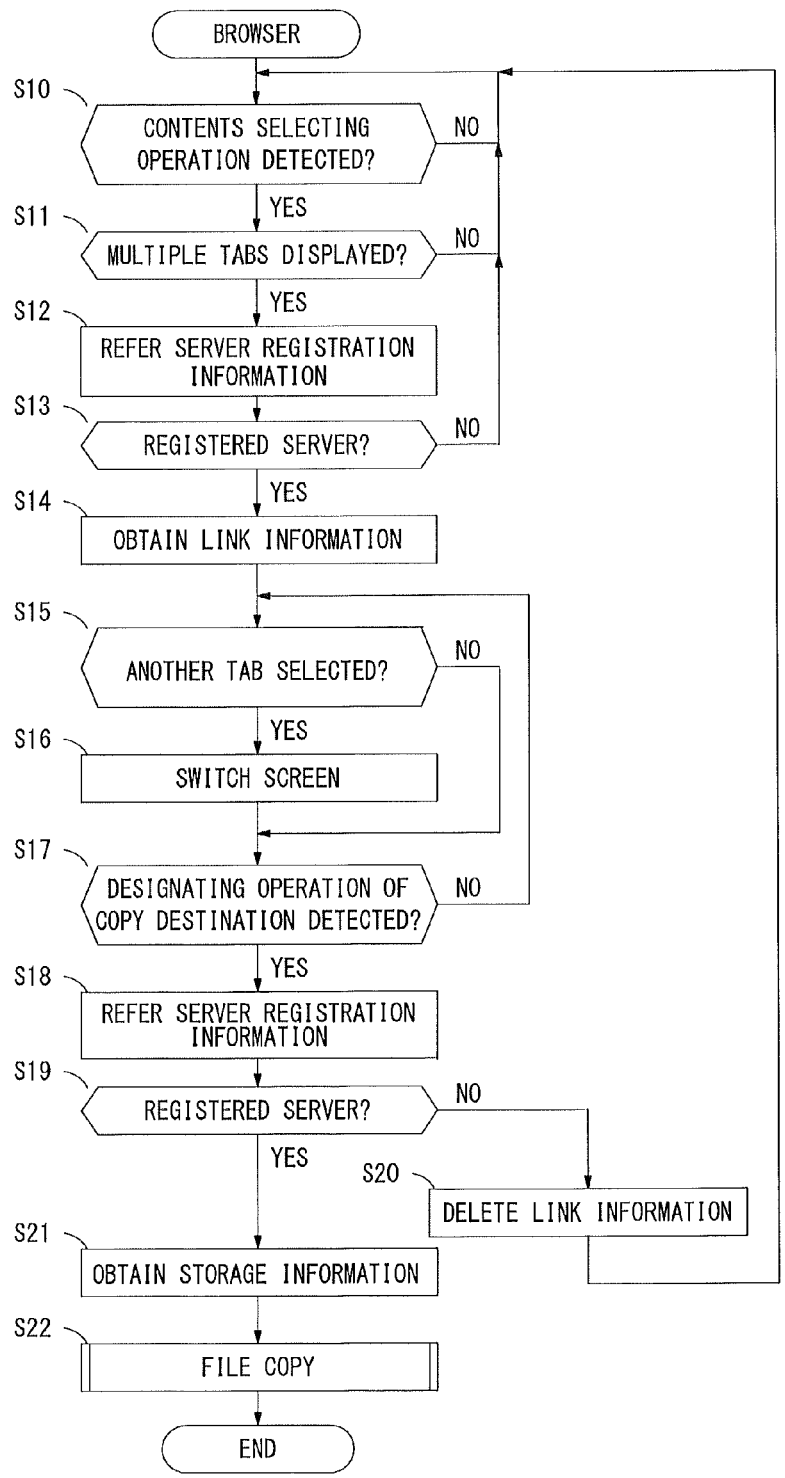
FIG. 9 is a flow diagram explaining an exemplary detailed sequential procedure of the process performed by the browser.
Figure 10:
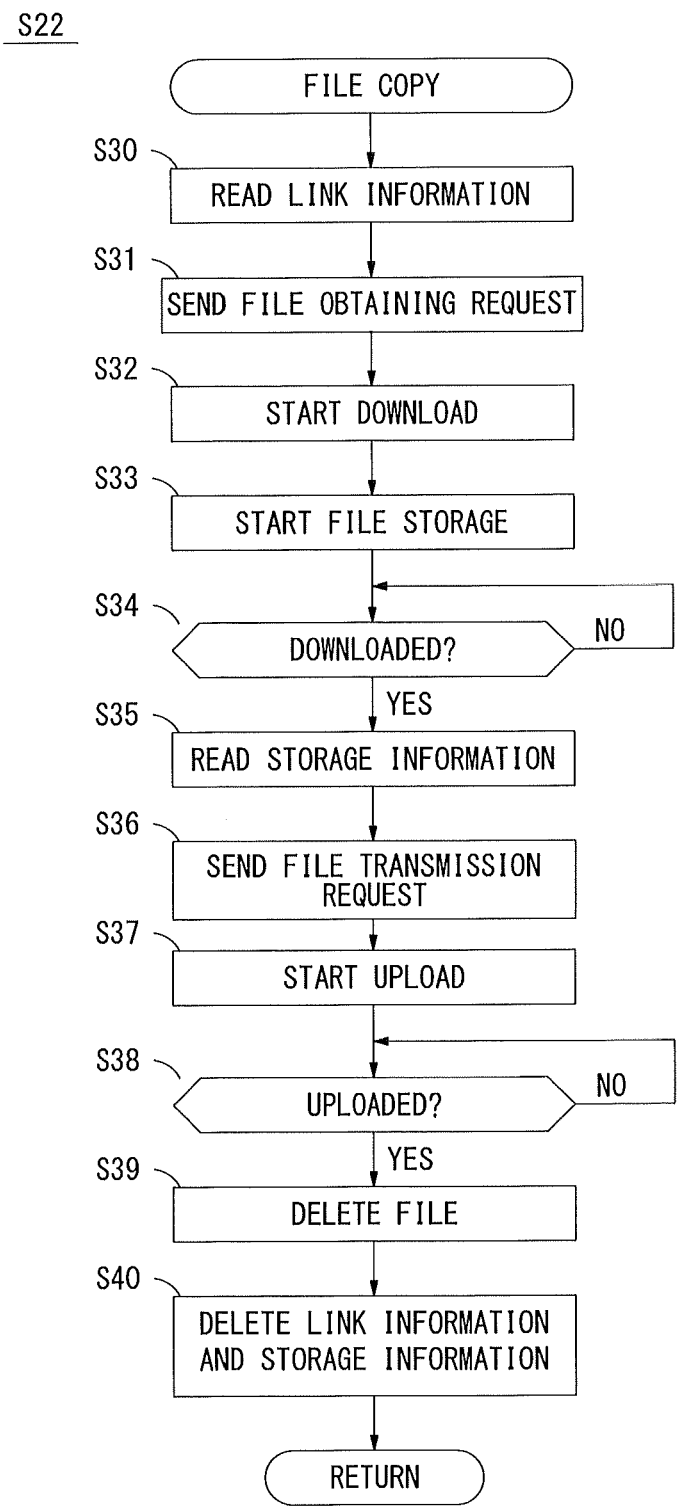
FIG. 10 is flow diagrams explaining an exemplary detailed sequential procedure of file copy.

Detailed sequential procedure of the process performed by the browser 29 is explained next. FIGS. 9 and 10 are flow diagrams explaining an exemplary detailed sequential procedure of the process performed by the browser 29. This process is repeatedly performed by the browser 29 after the browser 29 is started to run.

Upon the start of the process, the browser 29 is put into a standby state until detecting the web content selecting operation by the user (step S10). In response to detecting the web content selecting operation (when a result of step S10 is YES), the browser 29 determines whether or not the multiple contents screens (tab screens) are displayed on the display unit 13a (step S11). The multiple contents screens may not be displayed (when a result of step S11 is NO). The browser 29 returns to step S10 without carrying out the following process. The multiple contents screens may be displayed (when a result of step S11 is YES). In this case, the browser 29 brings the link information obtaining part 41 into operation. The link information obtaining part 41 refers the server registration information 23 (step S12), and determines if the contents screen on which the web content selecting operation is detected is the screen obtained from the storage server 5 registered with the server registration information 23 (step S13). If the screen is not obtained from the registered server (when a result of step S13 is NO), the process returns to step S10. The screen may be obtained from the registered server (when a result of step S13 is YES). In this case, the link information obtaining part 41 obtains the link information 51 to the substantial file corresponding to the web content selected by the user, and temporarily stores the obtained link information 51 (step S14).

Another tab may be selected by the user (when a result of step S15 is YES). In this case, the browser 29 switches the contents screen displayed at the front on the display unit 13a to the contents screen corresponding to the tab selected by the user (step S16). If the selecting operation of another tab by the user is not detected (when a result of step S15 is NO), the process in step S16 is skipped.

The browser 29 determines if the designating operation of the location to which the file is copied by the user is detected (step S17). When the designating operation by the user is not detected (when a result of step S17 is NO), the browser 29 returns to step S15 to repeat the above-described process. The designating operation by the user may be detected (when a result of step S17 is YES). In this case, the browser 29 brings the storage information obtaining part 42 into operation. The storage information obtaining part 42 refers the server registration information 23 (step S18), and determines if the contents screen on which the designating operation by the user is made is the screen obtained from the storage server 5 registered with the server registration information 23 (step S19). If the screen is not obtained from the registered server (when a result of step S19 is NO), the storage information obtaining part 42 discards the link information 51 obtained by the link information obtaining part 41 (step S20), and the process returns to step S10. The screen may be obtained from the registered server (when a result of step S19 is YES). In this case, the storage information obtaining part 42 obtains the storage information 52 relating to the storage region such as the location to which the file is copied designated by the user (step S21). The browser 29 then starts a file copy (step S22).

FIG. 10 is a flow diagram explaining the detailed exemplary sequential procedure of the file copy (step S22). Upon the start of the process, the browser 29 brings the file obtaining part 43 into operation. The file obtaining part 43 reads the link information 51 obtained by the link information obtaining part 41 (step S30), and sends the file obtaining request to the first storage server 5a based on the link information 51 (step S31). The file obtaining part 43 starts downloading the file 53 from the first storage server 5a (step S32), and starts storing the downloaded file 53 (step S33). The file obtaining part 43 is put into the standby state until the download of the file 53 is complete (step S34). After the download is complete, the substantial file 53 corresponding to the web content selected by the user is stored in the storage 12. The process by the file obtaining part 43 is then complete.

The browser 29 then brings the file transmission part 44 into operation. The file transmission part 44 reads the storage information 52 obtained by the storage information obtaining part 42 (step S35), and sends the file transmission request to the second storage server 5b based on the storage information 52 (step S36). The file transmission part 44 starts uploading the file 53 to the second storage server 5b (step S37). The file transmission part 44 is put into the standby state until the upload of the file 53 is complete (step S38). After the upload is complete, the file transmission part 44 deletes the file 53 stored in the storage 12 (step S39), then deletes the link information 51 and the storage information 52 (step S40). The process by the file transmission part 44 is then complete, and the whole process relating to the file transfer is complete.

The above-described process is performed by the browser 29 run on the information processing device 2. As a result, the file transfer between the first storage server 5a and the second storage server 5b is realized without installation of a dedicated server such as a conventional contents transfer server.

As described above, the file transfer is realized between the multiple servers relatively easily with the function of the browser without installation of the dedicated server such as the contents transfer server.

Second Preferred Embodiment

A second preferred embodiment is described next. According to the first preferred embodiment as described above, the browser 29 run on the information processing device 2 manages the multiple contents screens 61 and 62 as the tab screens. The browser 29 detects the drag-and-drop from one of the contents screens 61 and 62 into another contents screen, and transfers the file. On the other hand, the browser of the second preferred embodiment run on the information processing device 2 displays only one contents screen on the display unit 13*a*. The overall configuration of the image processing system 1 and the hardware configuration of the information processing device 2 of the second preferred embodiment are the same as those of the first preferred embodiment.

Figure 11:
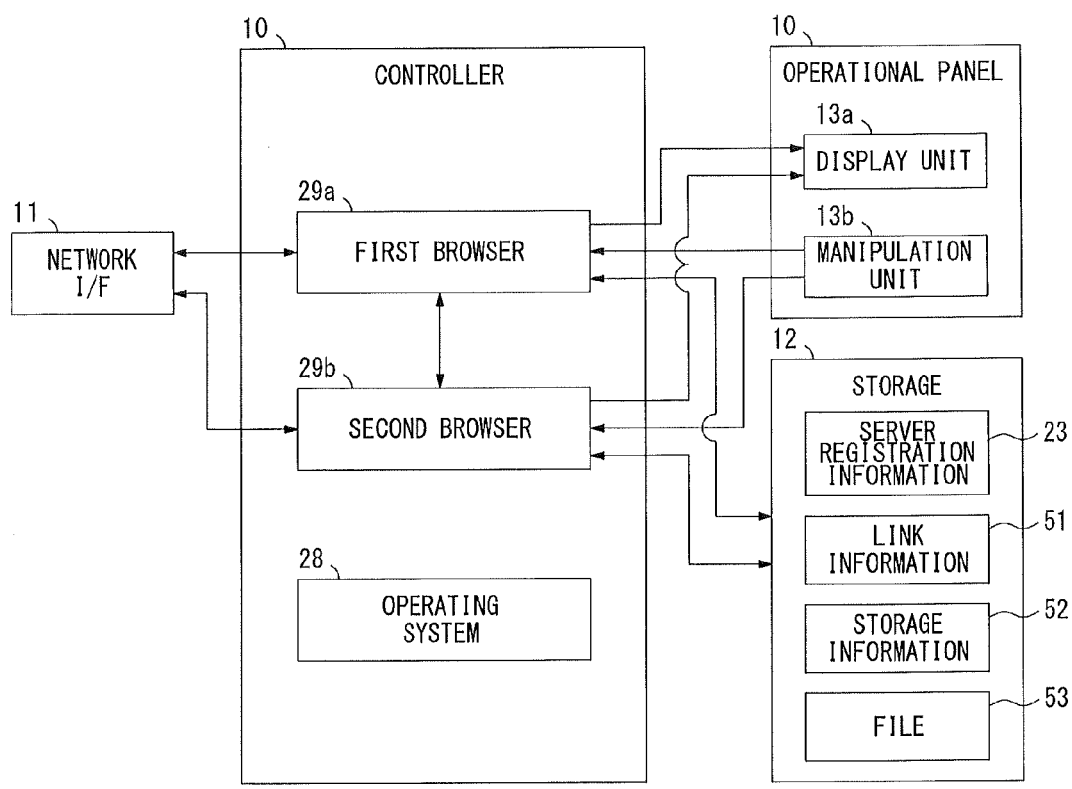
FIG. 11 is a block diagram showing an exemplary functional configuration of the controller of the information processing device.

FIG. 11 is a block diagram showing an exemplary functional configuration of the controller 10 of the information processing device 2. After the information processing device 2 is powered on, the controller 10 reads and executes the basic program 21, thereby serving as the operating system 28. In response to detecting an execution instruction of the browser program 22 by the user through the operational panel 13, the operating system 28 reads and executes the browser program 22 in the storage 12. As a result, the controller 10 runs a first browser 29*a*. The first browser 29*a* accesses the URL designated by the user via the network interface 11, and obtains the web contents from the URL, thereby displaying the first contents screen on the display unit 13*a*.

The operating system 28 detects again the execution instruction of the browser program 22 by the user as the first browser 29*a* is running. The operating system 28 then reads and executes the browser program 22 in the storage 12. The controller 10 then starts running a second browser 29*b*. To be more specific, the first browser 29*a* and the second browser 29*b* are running at the same time on the controller 10. The second browser 29*b* accesses the URL designated by the user via the network interface 11, and obtains the web contents from the URL, thereby displaying the second contents screen on the display unit 13*a*. On the display unit 13*a*, the multiple contents screens including the first contents screen by the first browser 29*a* and the second contents screen by the second browser 29*b* are displayed at the same time.

The first contents screen displayed by the first browser 29*a* may be the screen on which the web contents obtained by the first storage server 5*a* are laid out, and the second contents screen displayed by the second browser 29*b* may be the screen on which the web contents obtained by the second storage server 5*b* are laid out. The user, for example, may move the web content from the first contents screen to the second contents screen. In this case, the first browser 29*a* and the second browser 29*b* of the second preferred embodiment work together to perform the file transfer. The first browser 29*a* and the second browser 29*b* have the same configuration as the browser 29 of the first preferred embodiment.

Figure 12:
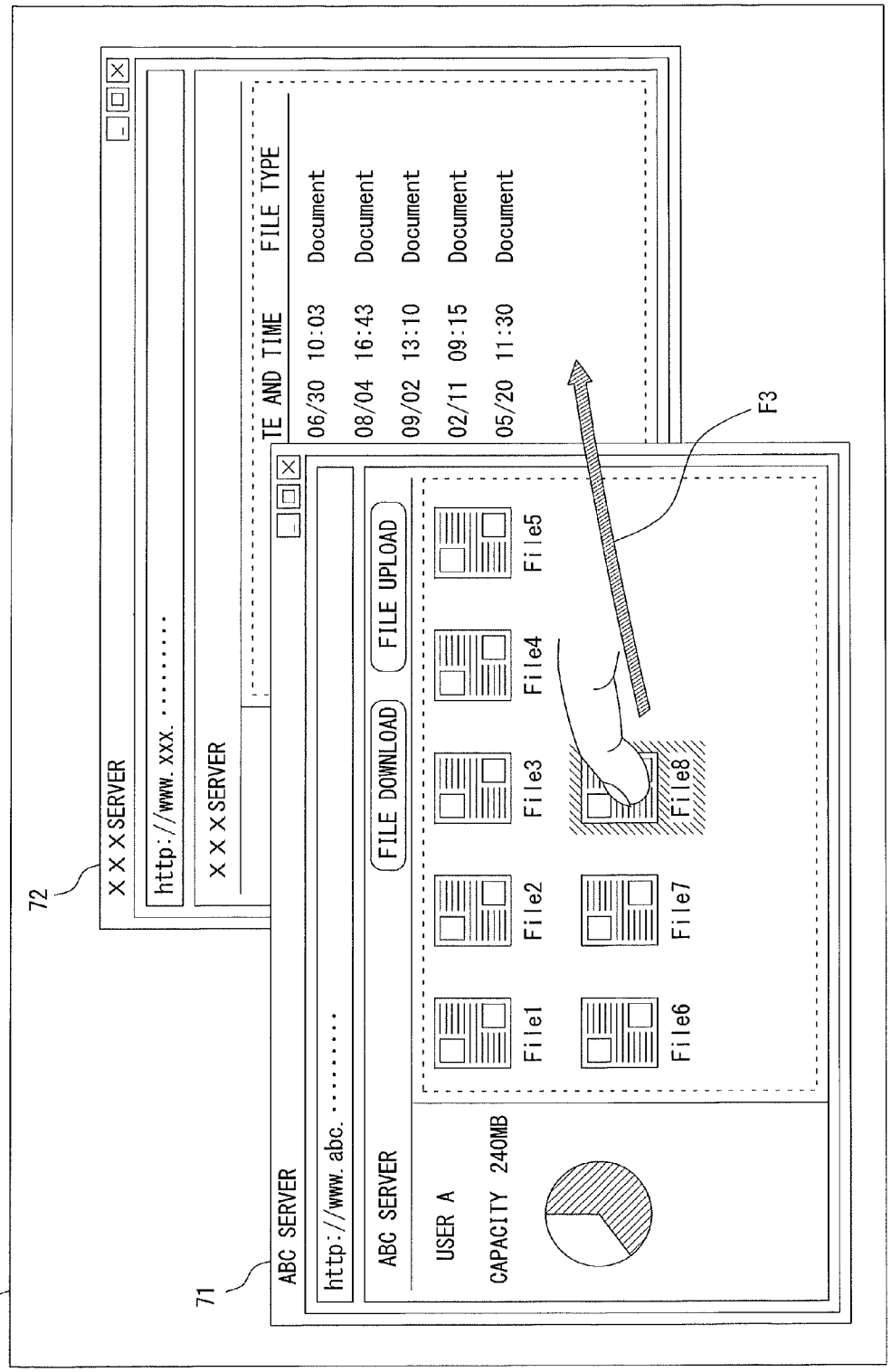
FIG. 12 shows an example of an operation of moving a web content by the user.
Figure 13:
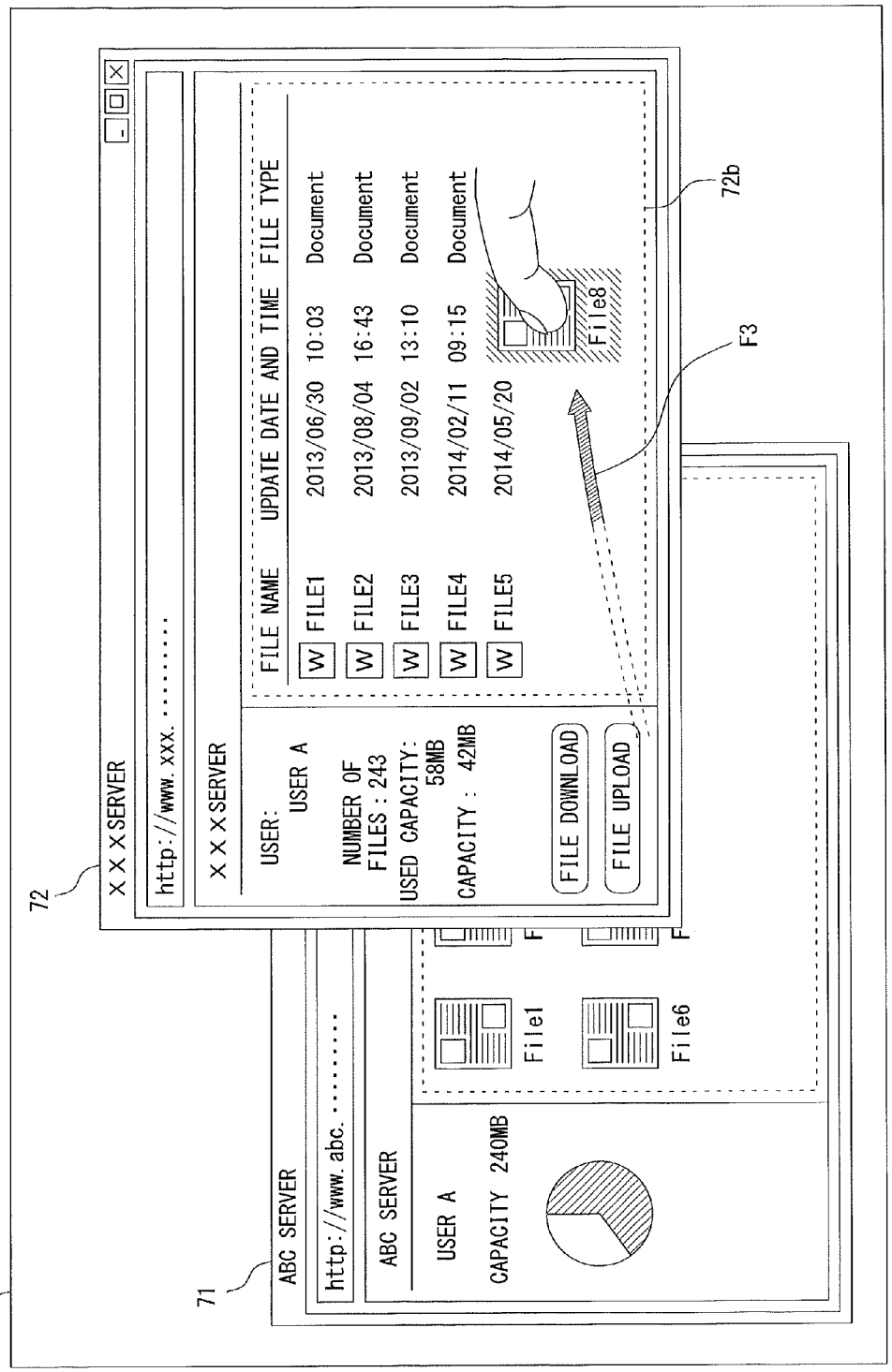
FIG. 13 shows an example of the operation of moving the web content by the user.

FIGS. 12 and 13 show an example of the operation of moving the web content by the user. As shown in FIG. 12, a first contents screen 71 and a second contents screen 72 are displayed on the display unit 13*a*. It is assumed that the user selects at least one of the web contents on the first contents screen 71 as the screens are displayed. In this case, the first browser 29*a* brings the link information obtaining part 41 into operation to obtain the link information 51 to the substantial file corresponding to the web content selected by the user, which is the same as the first preferred embodiment. In the example of FIG. 12, the icon image of "File 8" is selected by the user.

The user drags to move the selected icon image (web content) to the second contents screen 72 as shown with an arrow F3 with selecting the icon image of "File 8." In this case, the first browser 29*a* notifies the second browser 29*b* of the event. This communication may be directly sent between the first browser 29*a* and the second browser 29*b* or may be sent via the operating system 28.

In response to receiving the notification of the event from the first browser 29*a*, the second browser 29*b* activates the second contents screen 72, thereby detecting the user operation by taking over by the first browser 29*a*. It is assumed, for example, that the user starts dragging on the first contents screen 71 and still continuing on the second contents screen 72. The second browser 29*b* then maintains and receives the dragging of the icon image detected by the first browser 29*a*. Thus, the screen on the display unit 13*a* is switched from FIG. 12 to FIG. 13.

When the user drops the icon image into a display area 72*b* in which a list of files is displayed on the second contents screen 72, the second browser 29*b* determines the dropping as the designating operation of the storage of the file (location to which the file is moved or copied). The second browser 29*b* then brings the storage information obtaining part 42 into operation to obtain the storage information 52 corresponding to the display area 72*b* into which the user dropped, which is the same as the first preferred embodiment. After the storage information obtaining part 42 obtains the storage information 52, the second browser 29*b* notifies the first browser 29*a* of the completion of obtaining the storage information 52.

In response to receiving the completion of obtaining the storage information 52, the first browser 29*a* finds that the user operation to instruct the file transfer is completed normally, then brings the file obtaining part 43 into operation. The file obtaining part 43 of the first browser 29*a* reads the link information 51 which is obtained in advance by the link information obtaining part 41, and accesses the first storage server 5*a*. The file obtaining part 43 then downloads and obtains the substantial file 53 corresponding to the web content selected by the user from the first storage server 5*a*. The file obtaining part 43 stores the file 53 obtained from the first storage server 5*a* in the storage 12. After the download of the file 53 is complete, the first browser 29*a* notifies the second browser 29*b* of the completion of the download.

In response to receiving the download completion, the second browser 29*b* finds that the substantial file 53 corresponding to the web content selected by the user is obtained by the first browser 29*a*, and brings the file transmission part 44 into operation. The file transmission part 44 of the second browser 29*b* reads the storage information 52 which is obtained in advance by the storage information obtaining part 42, and accesses the second storage server 5*b*. The file transmission part 44 then sends and uploads the file 53 obtained by the first storage server 5*a* to the second storage server 5*b*.

Figure 14:
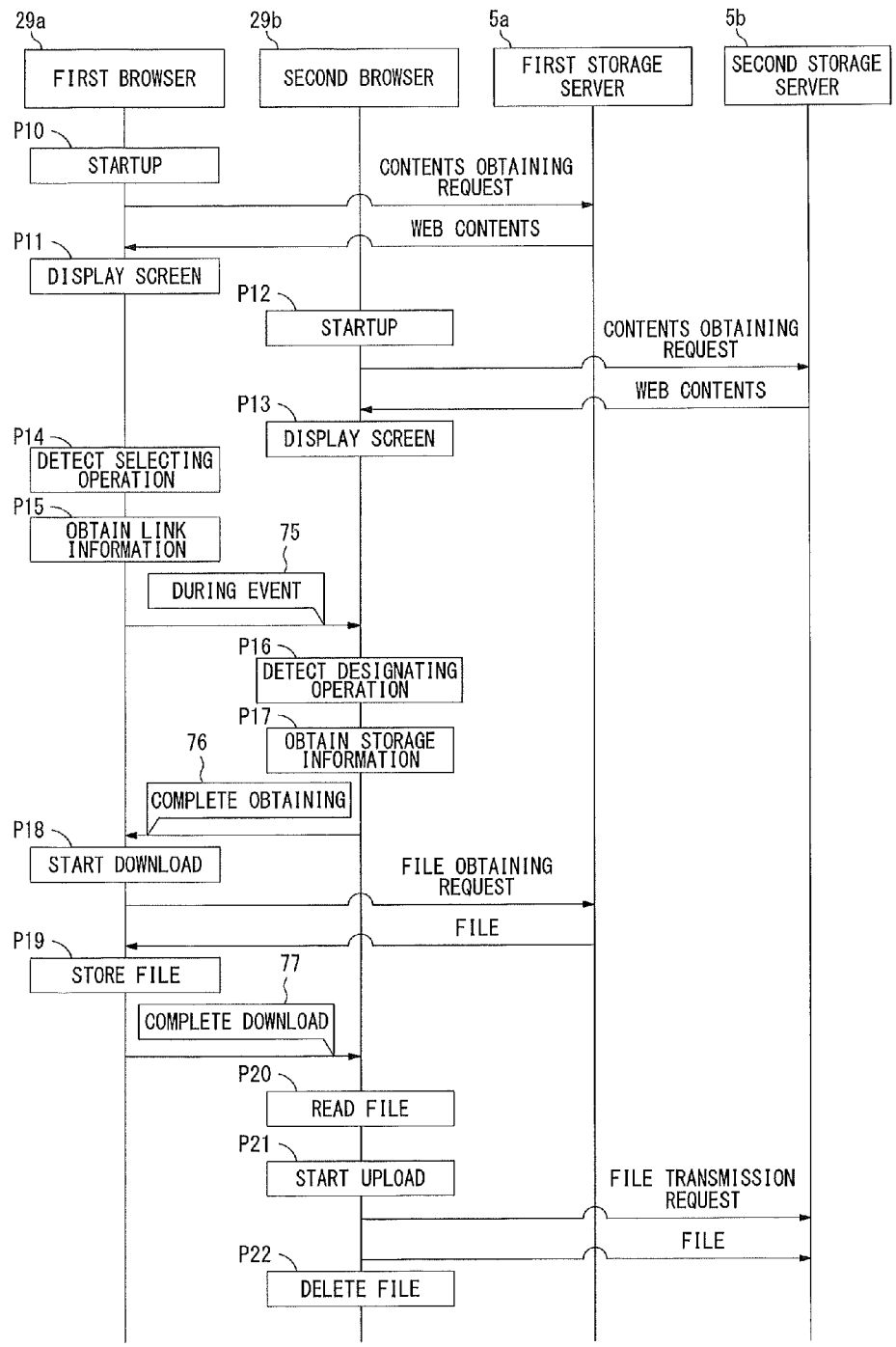
FIG. 14 is an exemplary sequential procedure of the process performed when first and second browsers work together to transfer the file between the multiple servers.

FIG. 14 is an exemplary sequential procedure of the process performed when the first and second browsers 29*a* and 29*b* having the above-described configuration work together to transfer the file between the multiple servers 5*a* and 5*b*. In the example of FIG. 14, the information processing device 2 runs the first browser 29*a* at first (process P10). The first browser 29*a* sends the contents obtaining request to the first storage server 5*a* based on the user instruction, and obtains the web contents from the first storage server 5*a*. The first browser 29*a* displays the first contents screen 71 as illustrated in FIG. 12 based on the web contents obtained from the first storage server 5*a* (process P11).

The information processing device 2 runs the second browser 29b at next based on the new browser startup instruction by the user (process P12). The second browser 29b also sends the contents obtaining request to the second storage server 5b based on the user instruction, and obtains the web contents from the second storage server 5b. The second browser 29b displays the second contents screen 72 as illustrated in FIG. 13 based on the web contents obtained from the second storage server 5b (process P13). Thus, the multiple contents screens 71 and 72 are displayed on the display unit 13a at the same time.

After the first browser 29a detects the web content selecting operation by the user on the first contents screen 71 (process P14), the link information obtaining part 41 of the first browser 29a obtains the link information 51 (process P15). After detecting the dragging of moving the web content selected by the user to the second contents screen 72, the first browser 29a outputs a notification 75 notifying of the event to the second browser 29b which is displaying the second contents screen 72. This notification 75 is to notify the second browser 29b from the first browser 29a that the file transfer operation by the user is still going on.

In response to detecting the designating operation of the storage of the file by the user (process P16), the second browser 29b which has received the notification 75 from the first browser 29a obtains the storage information 52 relating to the storage (process P17). The second browser 29b then outputs a notification 76 notifying that the obtaining process of the storage information 52 is complete to the first browser 29a (process P18).

After receiving the notification 76 from the second browser 29b, the first browser 29a starts the process to download and obtain the substantial file 53 corresponding to the web content selected by the user from the first storage server 5a based on the link information 51 obtained in process P15 (process P18). To be more specific, the first browser 29a sends the file obtaining request to the first storage server 5a based on the link information 51, and receives the substantial file 53 from the first storage server 5a. The first browser 29a then stores the file 53 obtained from the first storage server 5a (process P19). After the download of the file 53, the first browser 29a outputs a notification 77 of the download completion to the second browser 29b.

In response to receiving the notification 77 from the first browser 29a, the second browser 29b reads the file 53 in the storage 12 (process P20), and starts upload of the file 53 to the second storage server 5b with the storage information 52 obtained in process P17 (process P21). More specifically, after sending the file transmission request to the second storage server 5b, the second browser 29b sends the file 53. After the upload to the second storage server 5b, the second browser 29b deletes the file 53 in the storage 12 (process P22). At deleting the file 53, the second browser 29b also deletes the link information 51 and the storage information 52 in the storage 12.

Through the above-described process, the first browser 29a and the second browser 29b work together so that the file 53 stored in the first storage server 5a is transferred to the second storage server 5b. In the above-described process, the user is not required to press the button such as the download button to give the instruction to start the download of the file 53 or designate the storage of the downloaded file 53 for download of the file 53. Also, the user is not required to press the button such as the upload button to give the instruction to start the upload of the file 53 or designate the folder to which the file 53 is uploaded for upload of the file 53. To be more specific, the user makes the simple operation to move the web content on the first contents screen 71 to the second contents screen 72 so that the file 53 corresponding to the selected web content is automatically transferred to the second storage server 5b from the first storage server 5a in cooperation among the first and second browsers 29a and 29b. As a result, the operability in file transfer between the different servers 5a and 5b is extremely improved.

Figure 15:
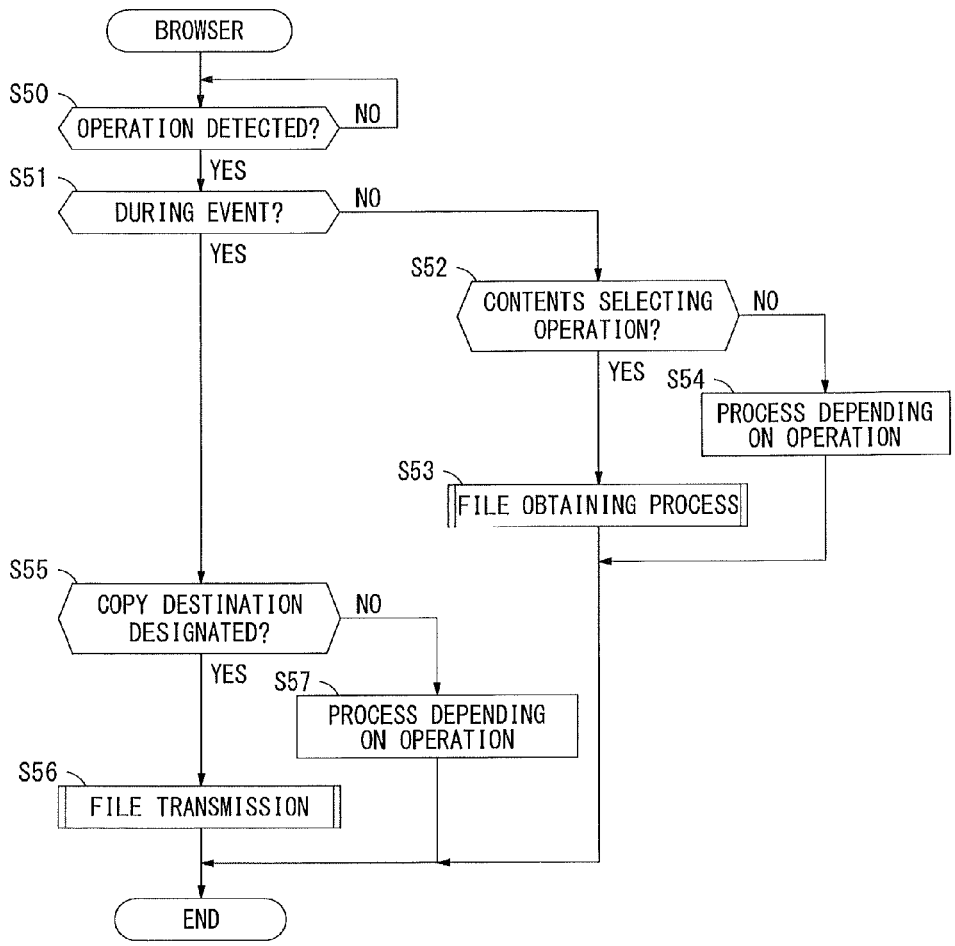
FIG. 15 is a flow diagram explaining an exemplary detailed sequential procedure performed by the first and the second browsers.

Detailed sequential procedure of the process performed by the first and second browsers 29a and 29b is explained next. FIGS. 15, 16 and 17 are flow diagrams explaining an exemplary detailed sequential procedure of the process performed by the first and second browsers 29a and 29b. This process is repeatedly performed by each of the first and second browsers 29a and 29b after the multiple browsers 29a and 29b are started to run on the information processing device 2. Although the process explained below is described as the one performed by the first browser 29a, the process by the second browser 29b is the same.

Upon the start of the process, the first browser 29a is put into the standby state until detecting the user operation on the first contents screen 71 (step S50). In response to detecting the user operation (when a result of step S50 is YES), the first browser 29a determines whether or not the notification of the event is received from another browser (for instance, the second browser 29b) (step S51). If it is not during the event (when a result of step S51 is NO), the first browser 29a determines if the user operation is the web content selecting operation (step S52). The operation may be the web content selecting operation (when a result of step S52 is YES). In this case, the first browser 29a performs the file obtaining process (step S53). If the operation is not the web content selecting operation (when a result of step S52 is NO), the first browser 29a performs the process corresponding to the user operation (step S54). The process corresponding to the user operation includes a process such as update of the first contents screen 71, for example.

The notification of the event may be received from another browser when the user operation is detected (when a result of step S51 is YES). In this case, the first browser 29a determines if the user operation is the designating operation of the storage such as the location to which the file is copied (step S55). When the user operation is the designating operation of the storage (when a result of step S55 is YES), the first browser 29a performs a file transmission (step S56). If the operation is not the designating operation of the storage (when a result of step S55 is NO), the first browser 29a performs the process corresponding to the user operation (step S57) which is the same as step S54.

FIG. 16 is a flow diagram explaining an exemplary detailed sequential procedure of the file obtaining process (step S53). Upon start of the file obtaining process (step S53), the first browser 29a brings the link information obtaining part 41 into operation. The link information obtaining part 41 refers the server registration information 23 (step S60), and determines if the first contents screen 71 is the screen obtained from the storage server 5 registered with the server registration information 23 (step S61). If the screen is not obtained from the registered server (when a result of step S61 is NO), the file obtaining process is complete. The screen may be obtained from the registered server (when a result of step S61 is YES). In this case, the link information obtaining part 41 obtains the link information 51 to the substantial file corresponding to the web content selected by the user, and temporarily stores the obtained link information 51 (step S62).

The first browser 29a detects that the web content selected by the user is dragged to the second contents screen 72 (when a result of step S63 is YES). The first browser 29a then notifies the second browser 29b which is displaying the second contents screen 72 of the event (step S64). The first browser 29a is put into the standby state until receiving some kind of notification from the second browser 29b. To be more specific, the first browser 29a determines if the notification of completion of the obtaining process of the storage information 52 is received from the second browser 29b (step S65). The notification of completion of the obtaining process of the storage information 52 may not be received (when a result of step S65 is NO). In this case, the first browser 29a determines whether or not the event completion notification is received from the second browser 29b (step S66). The completion of the event means that the event is complete without obtaining the storage information 52 by the second browser 29b after the first browser 29a detects the web content selecting operation. In response to receiving no event completion notification (when a result of step S66 is NO), the first browser 29a returns to step S65 to repeat the same process. The event completion notification may be received from the second browser 29b (when a result of step S66 is YES). The first browser 29a then completes the file obtaining process. The link information obtained in step S62 may be discarded.

After receiving the notification of completion of the obtaining process of the storage information 52 (when a result of step S65 is YES), the first browser 29a brings the file obtaining part 43 into operation. The file obtaining part 43 reads the link information 51 obtained in step S62 (step S67), and sends the file obtaining request to the first storage server 5a based on the link information 51 (step S68). The file obtaining part 43 starts downloading the file 53 from the first storage server 5a (step S69), and starts storing the downloaded file 53 (step S70). The file obtaining part 43 is put into the standby state until the download of the file 53 is complete (step S71). After the download is complete, the first browser 29a notifies the second browser 29b of the completion of the download (step S72). Thus, the file obtaining process is complete.

FIG. 17 is a flow diagram explaining an exemplary detailed sequential procedure of the file transmission (step S56). Upon start of the file transmission (step S56), the first browser 29a brings the storage information obtaining part 42 into operation. The storage information obtaining part 42 refers the server registration information 23 (step S80), and determines if the first contents screen 71 is the screen obtained from the storage server 5 registered with the server registration information 23 (step S81). If the screen is not obtained from the registered server (when a result of step S81 is NO), the first browser 29a sends the event completion notification to the second browser 29b which has notified of the event (step S82), then completes the file transmission. The screen may be obtained from the registered server (when a result of step S81 is YES). In this case, the storage information obtaining part 42 obtains the storage information 52 corresponding to the display area into which the user dropped, and temporarily stores the storage information 52 (step S83). The first browser 29a sends the notification of completion of the obtaining process of the storage information 52 to the second browser 29b which has notified of the event (step S84).

The first browser 29a is put into the standby state until the download completion notification is received from the second browser 29b (step S85). In response to receiving the download completion notification (when a result of step S85 is YES), the first browser 29a brings the file transmission part 44 into operation. The file transmission part 44 reads the storage information 52 obtained in step S83 (step S86), and sends the file transmission request to the second storage server 5b based on the storage information 52 (step S87). The file transmission part 44 reads the file 53 obtained by the second browser 29b (step S88), then starts uploading the file 53 to the second storage server 5b (step S89). The file transmission part 44 is put into the standby state until the upload of the file 53 is complete (step S90). After the upload is complete (when a result of step S90 is YES), the file transmission part 44 deletes the file 53 stored in the storage 12 (step S91), then deletes the link information 51 and the storage information 52 (step S92). As described above, the file transmission is complete.

It is assumed, for example, the first and the second browsers 29a and 29b are run on the controller 10 of the information processing device 2, and the first contents screen 71 and the second contents screen 72 are displayed on the display unit 13a. In this case, the first and the second browsers 29a and 29b perform the above-described process, thereby working together to realize the automatic file transfer between the first storage server 5a and the second storage server 5b corresponding to the user operation. Also in the second preferred embodiment, the same working-effect as the first preferred embodiment is realized as the installation of the dedicated server such as the conventional contents transfer server is not necessary and the user is only required to make some simple operations. Everything else other than the above-described points is the same as the first preferred embodiment.

(Modifications)

While the preferred embodiments of the present invention have been described above, the present invention is not limited to the preferred embodiments. Various modifications may be applied to the present invention.

The first storage server 5a and the second storage server 5b of the above-described preferred embodiments are installed, for example, on the cloud 4 on the internet. However, this is given not for limitation. To be more specific, one or both of the aforementioned first storage server 5a and second storage server 5b may be installed under the local network 3.

The first storage server 5a and the second storage server 5b of the above-described preferred embodiments are installed outside of the information processing device 2. Either of the first storage server 5a or the second storage server 5b may be embedded in the information processing device 2. To be more specific, the browsers 29, 29a and 29b run on the information processing device 2 internally access the IWS 17 loaded with the information processing device 2, thereby obtaining the web contents from the IWS 17 and displaying the contents screens. The IWS 17 is capable of generating the web contents to display, for instance, the list of the files stored in the BOX 24 included in the storage 12, and outputting the generated web contents to the browsers 29, 29a and 29b. In this case, the IWS 17 and the storage 12 loaded with the information processing device 2 fulfill the same function as the aforementioned storage server 5. The browsers 29, 29a and 29b display the contents screen provided by the IWS 17 and the contents screen obtained from the external storage server 5 on the display unit 13a. The browsers 29, 29a and 29b then performs the operations explained in each of the above-described preferred embodiments with displaying the screens, thereby realizing the file transfer between the BOX 24 which is embedded in the information processing device 2 and the external storage server 5.

In the preferred embodiments described above, the information processing device 2 is shown to be one of the MFPs with the multiple functions relating to the image processing such as scan function and print function, for example. The information processing device 2 of the present invention is not necessarily the device such as the MFPs including the multiple functions. To be more specific, the information processing device 2 may be a device with a single function relating to the image processing such as a device including a scanner or a printer. Alternatively, the information processing device 2 is not necessarily equipped with the image processing function. The information processing device 2 may be one of the general personal computers, tablets or smartphones. The functions of the above-described browsers 29, 29a and 29b are equipped with the device so that the automatic file transfer between the multiple servers 5a and 5b is realized.

As the multiple contents screens are displayed by the browsers 29, 29a and 29b on the display unit 13a, the user may make a series of operations such as drag-and-drop of the web content. In the above-described preferred embodiments, the automatic file transfer is carried out in response to receiving drag-and-drop of the web content. The user may give the instruction on file transfer not only with the series of operations such as drag-and-drop. It is assumed, for example, the user copies or cuts the web content shown on the first contents screen, then switches the screen to the second contents screen. The user may paste the copied or cut web content in the second contents screen. In also this case, the above-described browsers 29, 29a and 29b are capable of realizing the automatic file transfer.

What is claimed is:

1. An information processing device, comprising:
   a display part on which a variety of information is displayed;
   a manipulation part that receives a user operation;
   a browser that displays a contents screen on which web contents are laid out on said display part;
   a link information obtaining part that obtains link information to a file corresponding to a selected web content in response to detecting a selecting operation of at least one of the web contents on a first contents screen via said manipulation part when said browser is displaying the multiple contents screens including said first contents screen on which the web contents obtained from a first storage server are laid out and a second contents screen on which the web contents obtained from a second storage server are laid out on said display part, wherein the first storage server and the second storage server are external servers;
   a server information managing part that manages server registration information;
   a storage information obtaining part that, in response to said selecting operation, determines whether said second server is registered based on said server registration information, and
   when it is determined that said second server is registered, obtains storage information of said second storage server corresponding to a designated display area in response to detecting a designating operation of the display area of the web content on said second contents screen via said manipulation part after the link information is obtained by said link information obtaining part
   when it is determined that said second server is not registered, deletes and discards the link information obtained by the link information obtaining part;
   a file obtaining part that downloads and obtains the file corresponding to the web content selected with said selecting operation from said first storage server based on the link information obtained by said link information obtaining part after the storage information is obtained by said storage information obtaining part in response to said selecting operation of said web contents on said first contents screen corresponding to said first storage server and said designating operation on said second contents screen corresponding to said second storage server being performed; and
   a file transmitting part that sends the file obtained by said file obtaining part to said second storage server based on the storage information obtained by said storage information obtaining part, thereby uploading the file in response to said selecting operation of said web contents on said first contents screen corresponding to said first storage server and said designating operation on said second contents screen corresponding to said second storage server being performed.

2. The information processing device according to claim 1, further comprising:
   a screen controller that manages each of the multiple contents screens displayed by said browser as a tab screen which may be switched with a tab, and displays one of the contents screens corresponding to the tab at the front of the other contents screens when the tab is selected via said manipulation part.

3. The information processing device according to claim 2, wherein
   said link information obtaining part detects dragging of at least one web content on said first contents screen as said selecting operation when said first contents screen is displayed at the front of said second contents screen,
   if the web content on said first contents screen is dragged and the operation to move the dragged image to near the tab assigned to said second contents screen is detected, said screen controller displays said second contents screen at the front of said first contents screen, and
   after said screen controller displays said second contents screen at the front of said first contents screen, said storage information obtaining part detects dropping into the display area of the web content on said second contents screen as said designating operation.

4. The information processing device according to claim 1, wherein
   said browser includes a first browser that displays said first contents screen on said display part and a second browser that displays said second contents screen on said display part,
   when said selecting operation of at least one web content on said first contents screen is detected via said manipulation part, said first browser brings said link information obtaining part into operation to cause said link information obtaining part to obtain the link information to the file corresponding to the web content selected with said selecting operation, and
   when said designating operation of the display area of the web content on said second contents screen is detected via said manipulation part after the link information is obtained by said link information obtaining part, said second browser brings said storage information obtaining part into operation to cause said storage information obtaining part to obtain the storage information of said second storage server corresponding to the display area.

5. The information processing device according to claim 4, wherein
after causing said storage information obtaining part to obtain the storage information, said second browser notifies said first browser of completion of obtaining the storage information,
after receiving the notification of completion of obtaining the storage information from said second browser, said first browser brings said file obtaining part into operation to cause said file obtaining part to perform a process to download the file from said first storage server based on the link information obtained by said link information obtaining part, and notifies said second browser of completion of the download when the download by said file obtaining part is complete, and
in response to receiving the download completion notification from said first browser, said second browser brings said file transmitting part into operation to cause said file transmitting part to upload the file obtained by said file obtaining part based on the storage information obtained by said storage information obtaining part.

6. The information processing device according to claim 4, wherein
said first browser detects the dragging of at least one web content on said first contents screen as said selecting operation, and
said second browser detects the dropping into the display area of the web content on said second contents as said designating operation.

7. The information processing device according to claim 1, further comprising:
a storage in which a variety of information is stored, wherein
said file obtaining part stores the file downloaded and obtained from said first storage server in said storage, and
said file transmitting part deletes the file stored in said storage after reading the file in said storage and sending the read file to said second storage server.

8. The information processing device according to claim 7, wherein
said link information obtaining part stores the obtained link information in said storage,
said storage information obtaining part stores the obtained storage information in said storage, and
said file transmitting part deletes the link information and the storage information stored in said storage after reading the file in said storage and sending the read file to said second storage server.

9. The information processing device according to claim 1,
wherein said server information managing manages server registration information with which information relating to said first storage server and said second storage server is registered in advance, and wherein
in response to detecting said selecting operation of at least one web content on said first contents screen via said manipulation part as the multiple contents screens are displayed by said browser on said display part, said link information obtaining part obtains the link information if said first contents screen is a screen obtained from the first storage server registered with said server registration information.

10. A non-transitory computer readable recording medium storing a browser program to be executed by an information processing device including a display part on which a variety of information is displayed and a manipulation part receiving a user operation, execution of the program causing said information processing device to function as a browser that displays a contents screen on which web contents are laid out on said display part, execution of the browser program by said information processing device causing said information processing device to execute the steps of:
(a) obtaining link information to a file corresponding to a selected web content in response to detecting a selecting operation of at least one of the web contents on a first contents screen via said manipulation part when said browser is displaying the multiple contents screens including said first contents screen on which the web contents obtained from a first storage server are laid out and a second contents screen on which the web contents obtained from a second storage server are laid out on said display part, wherein the first storage server and the second storage server are external servers;
(b) in response to said selecting operation, determining whether said second server is registered based on server registration information and (i) when it is determined that said second server is registered, obtaining storage information of said second storage server corresponding to a designated display area in response to detecting a designating operation of the display area of the web content on said second contents screen via said manipulation part after the link information is obtained in said step (a) and (ii) when it is determined that said second server is not registered, deleting and discarding the link information obtained in step (a);
(c) downloading and obtaining the file corresponding to the web content selected with said selecting operation from said first storage server based on the link information obtained in said step (a) after the storage information is obtained in said step (b) and in response to said selecting operation of said web contents on said first contents screen corresponding to said first storage server and said designating operation on said second contents screen corresponding to said second storage server being performed; and
(d) sending the file obtained in said step (c) to said second storage server based on the storage information obtained in said step (b), thereby uploading the file in response to said selecting operation of said web contents on said first contents screen corresponding to said first storage server and said designating operation on said second contents screen corresponding to said second storage server being performed.

11. The non-transitory computer readable recording medium according to claim 10, execution of the browser program by said information processing device causing said information processing device to execute the further step of:
(e) managing each of the multiple contents screens displayed by said browser as a tab screen which may be switched with a tab, and displaying one of the contents screens corresponding to the tab at the front of the other contents screens when the tab is selected via said manipulation part.

12. The non-transitory computer readable recording medium according to claim 11, wherein
dragging of at least one web content on said first contents screen is detected as said selecting operation when said first contents screen is displayed at the front of said second contents screen in said step (a), if the web content on said first contents screen is dragged and the operation to move the dragged image to near the tab assigned to said second contents screen is detected, said second contents screen is displayed at the front of said first contents screen in said step (e), and after said second contents screen is displayed at the front of said first contents screen in said step (e), dropping into the display area of the web content on said second contents screen is detected as said designating operation in said step (b).

13. The non-transitory computer readable recording medium according to claim 10, wherein
execution of the browser program by said information processing device causing said information processing device to function as a system comprising: a first browser that displays said first contents screen on said display part and a second browser that displays said second contents screen on said display part,
when said first browser detects said selecting operation of at least one web content on said first contents screen via said manipulation part, said first browser causes said information processing device to perform said step (a), thereby causing said information processing device to obtain the link information to the file corresponding to the web content selected with said selecting operation, and
when said second browser detects said designating operation of the display area of the web content on said second contents screen via said manipulation part after the link information is obtained in said step (a), said second browser causes said information processing device to perform said step (b), thereby causing said information processing device to obtain the storage information of said second storage server corresponding to the display area.

14. The non-transitory computer readable recording medium according to claim 13, wherein
after causing said information processing device to obtain the storage information by performing said step (b), said second browser causes said information processing device to notify said first browser of completion of obtaining the storage information,
after receiving the notification of completion of obtaining the storage information, said first browser causes said information processing device to perform said step (c), thereby causing said information processing device to perform a process to download the file from said first storage server based on the link information obtained in said step (a), and to notify said second browser of completion of the download when the download in said step (c) is complete, and
in response to receiving the download completion notification, said second browser causes said information processing device to perform said step (d), thereby causing said information processing device to upload the file obtained in said step (c) based on the storage information obtained in said step (b).

15. The non-transitory computer readable recording medium according to claim 13, wherein
said first browser causes said information processing device to detect the dragging of at least one web content on said first contents screen as said selecting operation, and
said second browser causes said information processing device to detect the dropping into the display area of the web content on said second contents as said designating operation.

16. The non-transitory computer readable recording medium according to claim 10, wherein
said information processing device includes a storage in which a variety of information is stored,
the file downloaded and obtained from said first storage server is stored in said storage in said step (c), and
the file stored in said storage is deleted after reading the file in said storage and the read file is sent to said second storage server in said step (d).

17. The non-transitory computer readable recording medium according to claim 16, wherein
the obtained link information is stored in said storage in said step (a),
the obtained storage information is stored in said storage in said step (b), and
the link information and the storage information stored in said storage is deleted in said step (d) after the file in said storage is read and the read file is sent to said second storage server.

18. The non-transitory computer readable recording medium according to claim 10, execution of the browser program by said information processing device causing said information processing device to execute the further step of:
(f) managing server registration information with which information relating to said first storage server and said second storage server is registered in advance, wherein
when said selecting operation of at least one web content on said first contents screen is detected via said manipulation part as the multiple contents screens are displayed by said browser on said display part, the link information is obtained in said step (a) if said first contents screen is a screen obtained from the first storage server registered with said server registration information.

19. An information processing method performed on an information processing device including a display part on which a variety of information is displayed and a manipulation part receiving a user operation, the method comprising the steps of:
(a) running a browser that displays a contents screen on which web contents are laid out on said display part;
(b) obtaining link information to a file corresponding to a selected web content in response to detecting a selecting operation of at least one of the web contents on a first contents screen via said manipulation part when said browser is displaying the multiple contents screens including said first contents screen on which the web contents obtained from a first storage server are laid out and a second contents screen on which the web contents obtained from a second storage server are laid out on said display part, wherein the first storage server and the second storage server are external servers;
(c) in response to said selecting operation, determining whether said second server is registered based on server registration information and (i) when it is determined that said second server is registered, obtaining storage information of said second storage server corresponding to a designated display area in response to detecting a designating operation of the display area of the web content on said second contents screen via said manipulation part after the link information is obtained in said step (b) and (ii) when it is determined that said second server is not registered, deleting and discarding the link information obtained in step (b);
(d) downloading and obtaining the file corresponding to the web content selected with said selecting operation from said first storage server based on the link information obtained in said step (b) after the storage information is obtained in said step (c) and in response to said selecting operation of said web contents on said first contents screen corresponding to said first storage server and said designating operation on said second contents screen corresponding to said second storage server being performed; and (e) sending the file obtained in said step (d) to said second storage server based on the storage information obtained in said step (c), thereby uploading the file in response to said selecting operation of said web contents on said first contents screen corresponding to said first storage server and said designating operation on said second contents corresponding to said second storage server being performed.

* * * * *